(12) United States Patent
Hasebe et al.

(10) Patent No.: US 8,965,061 B2
(45) Date of Patent: Feb. 24, 2015

(54) PERSON RETRIEVAL APPARATUS

(75) Inventors: Mitsutake Hasebe, Kawasaki (JP); Hiroshi Sukegawa, Yokohama (JP); Kei Takizawa, Kawasaki (JP); Yasuhiro Aoki, Kawasaki (JP)

(73) Assignee: Kabuhiki Kaisha Toshiba, Tokyo (JP)

( * ) Notice: Subject to any disclaimer, the term of this patent is extended or adjusted under 35 U.S.C. 154(b) by 1208 days.

(21) Appl. No.: 12/540,886

(22) Filed: Aug. 13, 2009

(65) Prior Publication Data
US 2009/0324020 A1 Dec. 31, 2009

Related U.S. Application Data

(63) Continuation of application No. PCT/JP2008/052273, filed on Feb. 12, 2008.

(30) Foreign Application Priority Data

Feb. 13, 2007 (JP) ................................. 2007-032341

(51) Int. Cl.
*G06K 9/00* (2006.01)
*G06T 7/00* (2006.01)
(Continued)

(52) U.S. Cl.
CPC .............. *G06T 7/00* (2013.01); *G06K 9/00228* (2013.01); *G06K 9/036* (2013.01); *G06K 9/6214* (2013.01)
USPC ........................................................ 382/115

(58) Field of Classification Search
CPC ....................... G06K 9/00281; G06K 9/00248; G06K 9/00885; G06K 2009/00932; G06K 9/00228; G06K 9/00221; G06K 9/00288; G06F 17/30265; G06F 17/30247; G06F 17/3025; G06F 17/30259; G06F 17/30256; G06F 21/32; G07C 9/00158; G07C 9/00087
See application file for complete search history.

(56) References Cited

U.S. PATENT DOCUMENTS 7,673,145 B2 * 3/2010 Hatano et al. .................. 713/182
7,957,567 B2 * 6/2011 Yamaguchi .................... 382/118
(Continued)

FOREIGN PATENT DOCUMENTS

| JP | 06-325180 | 11/1994 |
| JP | 11-250364 | 9/1999 |

(Continued)

OTHER PUBLICATIONS

International Search Report dated May 1, 2008 for PCT/JP2008/052273.

(Continued)

*Primary Examiner* — Vikkram Bali
(74) *Attorney, Agent, or Firm* — Oblon, Spivak, McClelland, Maier & Neustadt, L.L.P.

(57) ABSTRACT

In a person retrieval apparatus, a plurality of extraction processing sections each extract personal biometric information from images taken by a plurality of cameras. A quality determination section determines a quality of each piece of biometric information extracted by the extraction processing sections. A reliability level setting section sets a reliability level to each piece of biometric information on the basis of the quality determined by the quality determination section. The biometric information extracted by the extraction processing sections and the reliability level set by the reliability level setting section are stored in a memory. In this state, in the person retrieval apparatus, the face retrieval section performs person retrieval processing on each piece of biometric information stored in the memory in descending order of the reliability level corresponding to each piece of biometric information.

6 Claims, 10 Drawing Sheets

(51) Int. Cl.
*G06K 9/03* (2006.01)
*G06K 9/62* (2006.01)

(56) References Cited

U.S. PATENT DOCUMENTS

| | | | |
|---|---|---|---|
| 8,031,914 B2* | 10/2011 | Zhang | 382/118 |
| 2003/0091724 A1* | 5/2003 | Mizoguchi | 427/1 |
| 2005/0089197 A1* | 4/2005 | Iwasaki et al. | 382/115 |
| 2006/0271525 A1 | 11/2006 | Sukegawa | |

FOREIGN PATENT DOCUMENTS

| | | |
|---|---|---|
| JP | 2001-202507 | 7/2001 |
| JP | 2001-243466 | 9/2001 |
| JP | 2002-222424 | 8/2002 |
| JP | 2005-100369 | 4/2005 |
| JP | 2006-236244 | 9/2006 |
| JP | 2006-236260 | 9/2006 |

OTHER PUBLICATIONS

Yamaguchi et al. "Face Recognition System using Temporal Image Sequence"; Shingakugihou PR, MU97-50; Jun. 1997 ; pp. 17-23.
Fukui et al. "Facial Feature point extraction method based on combination of shape extraction and pattern matching"; Shingakuron (D); 1997; vol. J80-D-H, No. 8, 2170-2177.

* cited by examiner

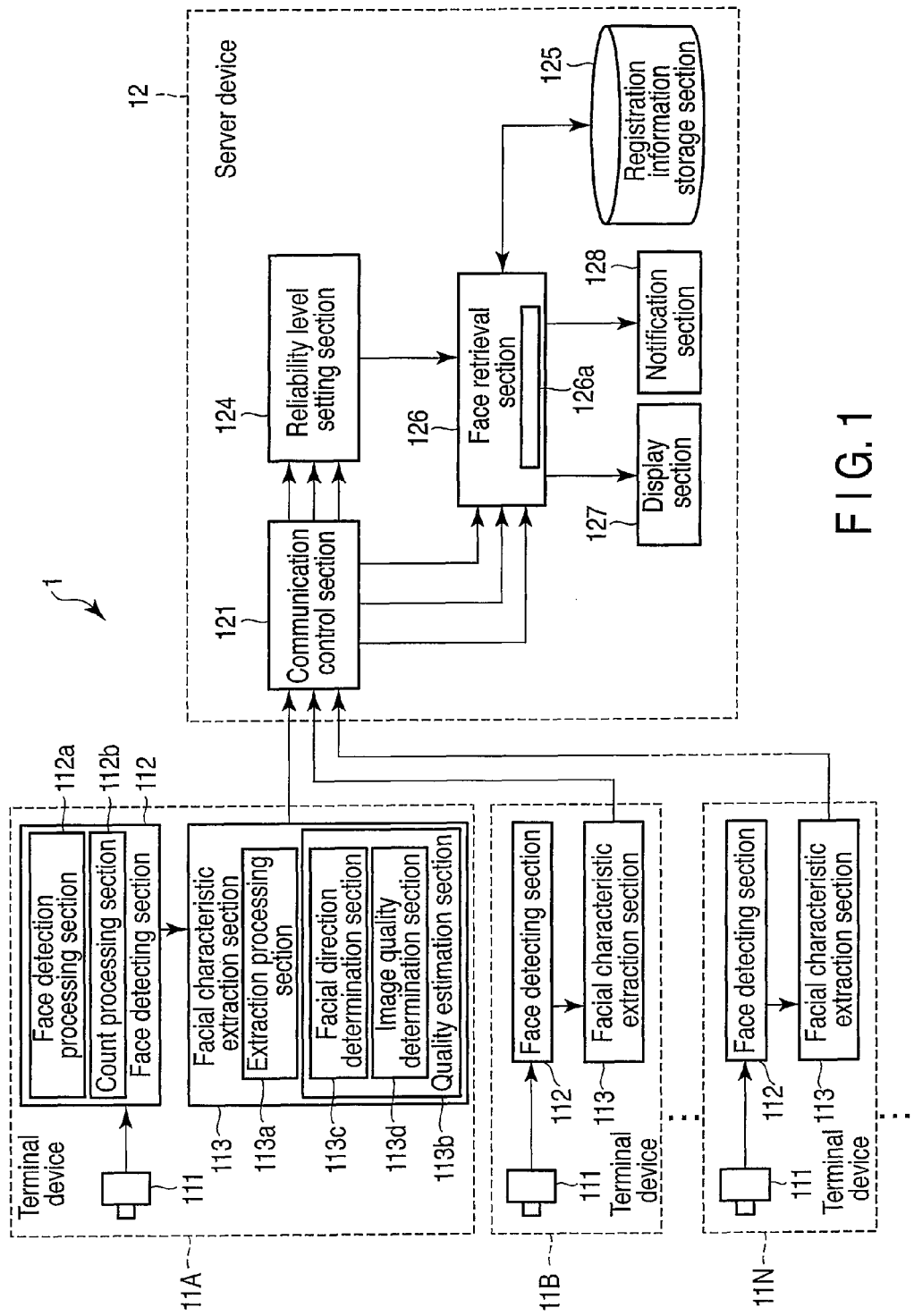
F I G. 1

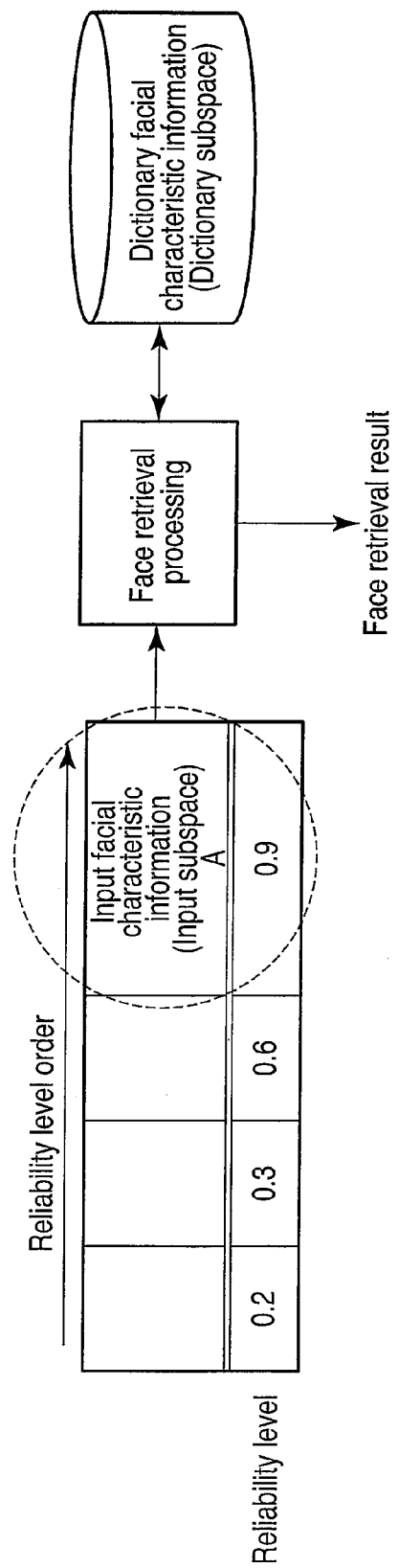
F I G. 2

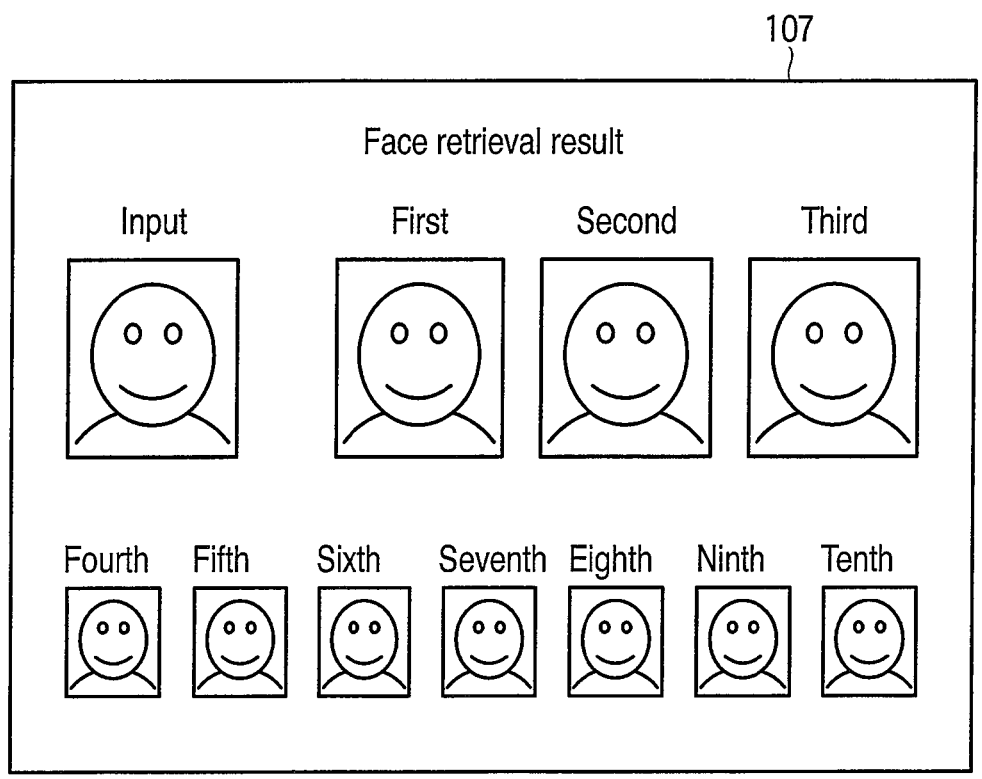
F I G. 3

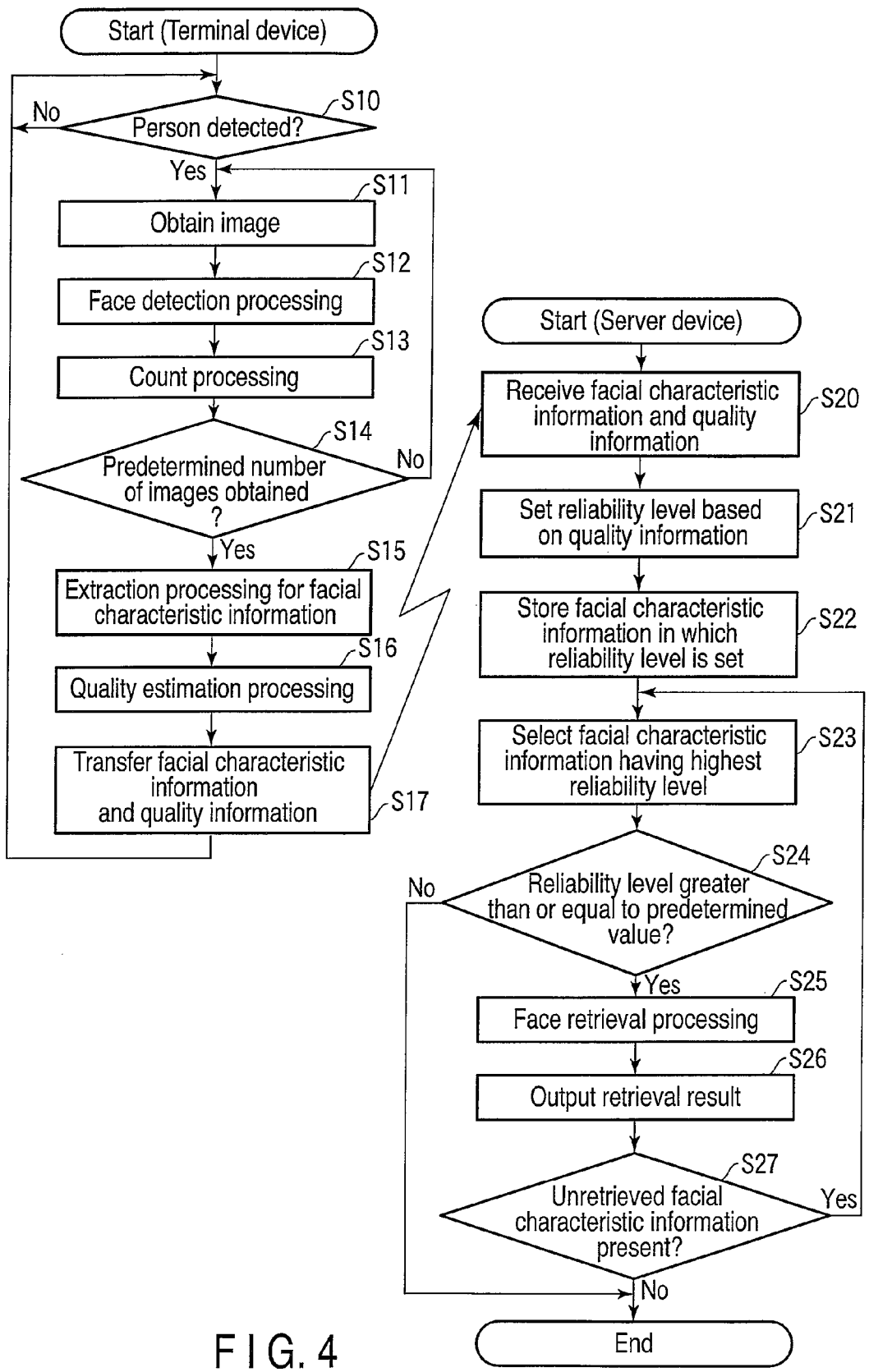
F I G. 4

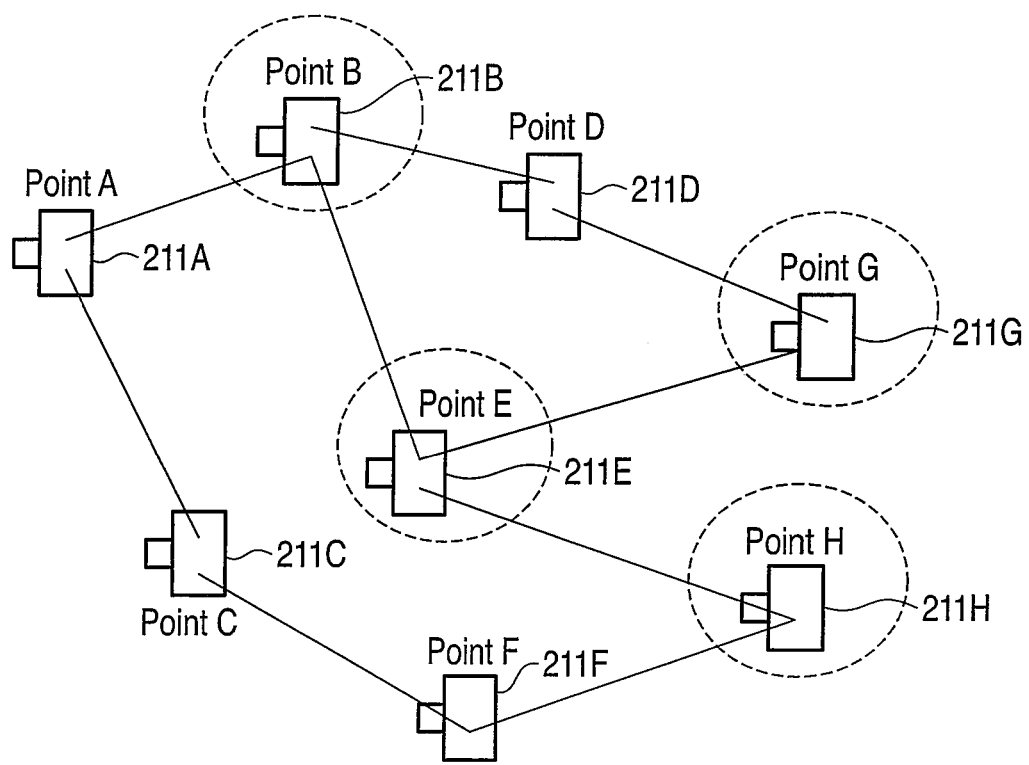
F I G. 6

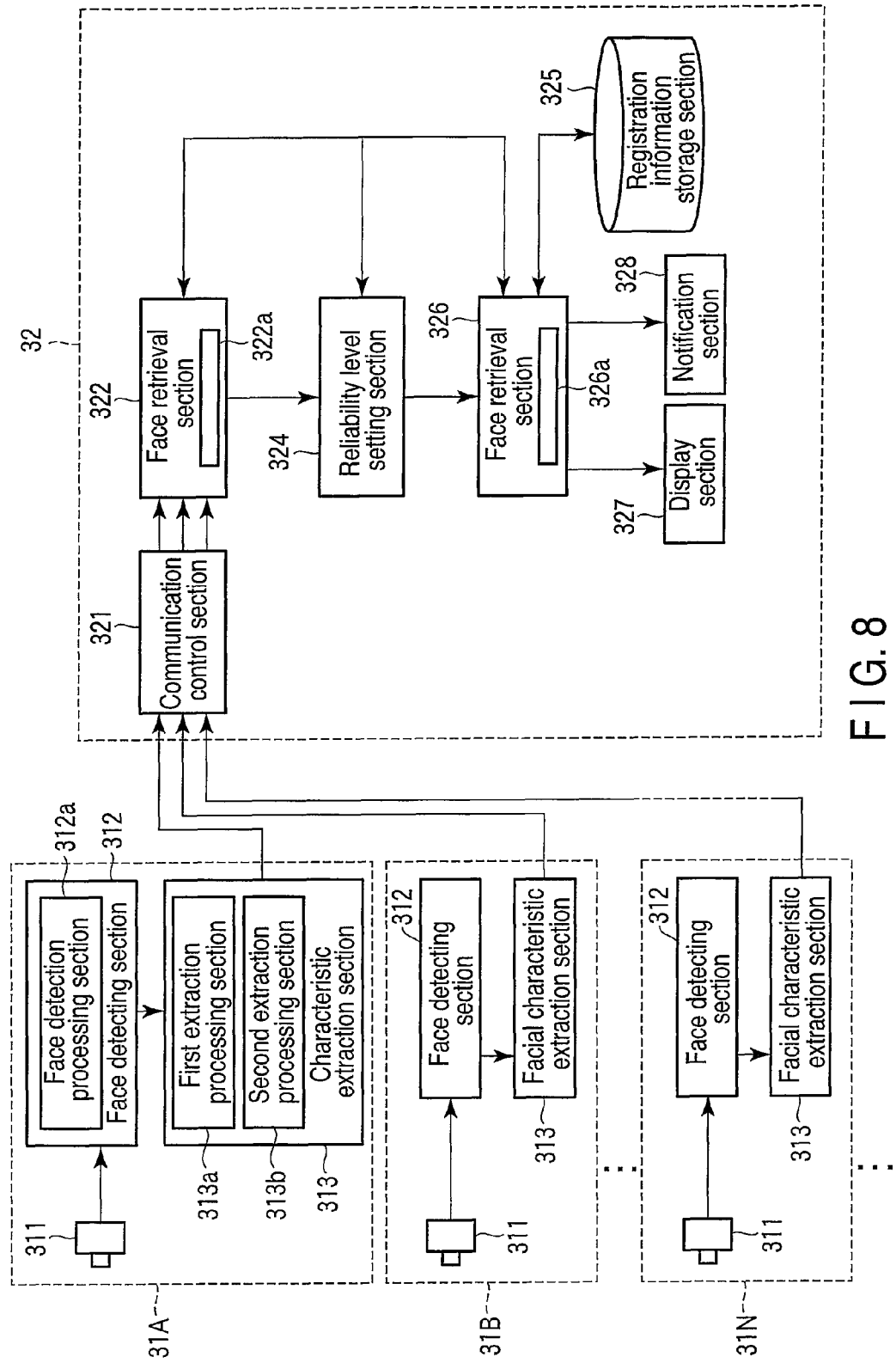
F I G. 8

PERSON RETRIEVAL APPARATUS

CROSS-REFERENCE TO RELATED APPLICATIONS

This is a Continuation Application of PCT Application No. PCT/JP2008/052273, filed Feb. 12, 2008, which was published under PCT Article 21(2) in Japanese.

This application is based upon and claims the benefit of priority from prior Japanese Patent Application No. 2007-032341, filed Feb. 13, 2007, the entire contents of which are incorporated herein by reference.

BACKGROUND OF THE INVENTION

1. Field of the Invention

The present invention relates to a person retrieval apparatus for retrieving a person, who is similar to a person taken by, for example, a camera from registrants stored in a dictionary.

2. Description of the Related Art

Conventionally, a person retrieval apparatus retrieves a person similar to a person taken by a camera from a plurality of candidates (registrants). Some person retrieval apparatuses retrieve a person based on the similarity in biometric information of the person. For example, in the person retrieval apparatus for searching a person based on a face image as the biometric information, a person similar to a person taken by a camera is specified from a plurality of registrants on the basis of the similarity between facial characteristic information obtained from an image taken by a camera and facial characteristic information of each registrant registered in a dictionary.

There are proposed various types of apparatuses for identifying the facial characteristic information. For example, Jpn. Pat. Appln. KOKAI Publication No. 2005-53385 discloses a walker authentication device for acquiring facial characteristic information from an image obtained by taking a walking person (walker) to collate the obtained facial characteristic information with each facial characteristic information registered in a dictionary. Meanwhile, Jpn. Pat. Appln. KOKAI Publication No. 2005-100369 describes means for extracting facial characteristic information of a person, who is a target to be authenticated, on the basis of a plurality of images taken by a plurality of image pickup means. Jpn. Pat. Appln. KOKAI Publication No. 2005-100369 discloses to narrow down both a region to be processed and candidates to be searched, and to perform image correction in accordance with determination of an image quality.

However, in general, in a system for retrieving a person based on face images taken by a plurality of image pickup means, the person retrieval processing based on biometric information is performed in the order of generation of a request for the person retrieval (in the order in which the biometric information extracted from an image taken by a camera is obtained). In this processing, when the person retrieval request is frequently generated, or when an information processing ability required for the person retrieval processing is not sufficient, there is a problem that the person retrieval processing cannot be completed within a desired processing time in many cases.

BRIEF SUMMARY OF THE INVENTION

An object of an embodiment of the present invention is to provide a person retrieval apparatus capable of efficiently performing person retrieval processing based on biometric information A person retrieval apparatus of the present invention is an apparatus for retrieving a person on the basis of personal biometric information, comprising: an extraction section which extracts personal biometric information from an image taken by a camera; a quality determination section which determines a quality of the biometric information extracted by the extraction section; a setting section which sets a reliability level of the biometric information extracted by the extraction section on the basis of the quality determined by the quality determination section; a memory which stores the biometric information extracted by the extraction section and the reliability level set by the setting section in association with each other; and a retrieval section which performs person retrieval processing on each piece of biometric information stored in the memory, in descending order of the reliability level corresponding to each piece of biometric information.

A person retrieval apparatus of the present invention is an apparatus for retrieving a person on the basis of personal biometric information, comprising: an extraction section which extracts personal biometric information from images taken by each camera; a position storage section which stores information indicating a priority level of person retrieval processing according to an image-taking position of each camera; a setting section which sets a reliability level to the biometric information extracted by the extraction section on the basis of information, stored in the position storage section, indicating the priority level of the person retrieval processing according to the image-taking position of each camera; a memory which stores the biometric information extracted by the extraction section and the reliability level set by the setting section in association with each other; and a retrieval section which performs the person retrieval processing on each piece of biometric information stored in the memory, in descending order of the reliability level corresponding to each piece of biometric information.

A person retrieval apparatus of the present invention is an apparatus for retrieving a person on the basis of personal biometric information, comprising: an extraction section which extracts personal biometric information from an image taken by a camera; a tracking section which tracks a person having the biometric information extracted by the extraction section; a setting section which sets a reliability level to the biometric information extracted by the extraction section on the basis of the tracking result in the tracking section; a memory which stores the biometric information extracted by the extraction section and the reliability level set by the setting section in association with each other; and a retrieval section which performs person retrieval processing on each piece of biometric information stored in the memory, in descending order of the reliability level corresponding to each piece of biometric information.

BRIEF DESCRIPTION OF THE SEVERAL VIEWS OF THE DRAWING

FIG. 1 is a block diagram schematically showing a configuration of a person retrieval apparatus according to a first embodiment.

FIG. 2 is an explanatory diagram of retrieval processing execution in accordance with a reliability level in the first embodiment.

FIG. 3 is a schematic view showing a display example of a face retrieval result in the first embodiment.

FIG. 4 is a flowchart for explaining a processing flow in the person retrieval apparatus according to the first embodiment.

FIG. 6 is an explanatory diagram relating to setting of a reliability level in the second embodiment.

FIG. 8 is a block diagram schematically showing a configuration of a person retrieval apparatus according to a third embodiment.

DETAILED DESCRIPTION OF THE INVENTION

Figure 5:
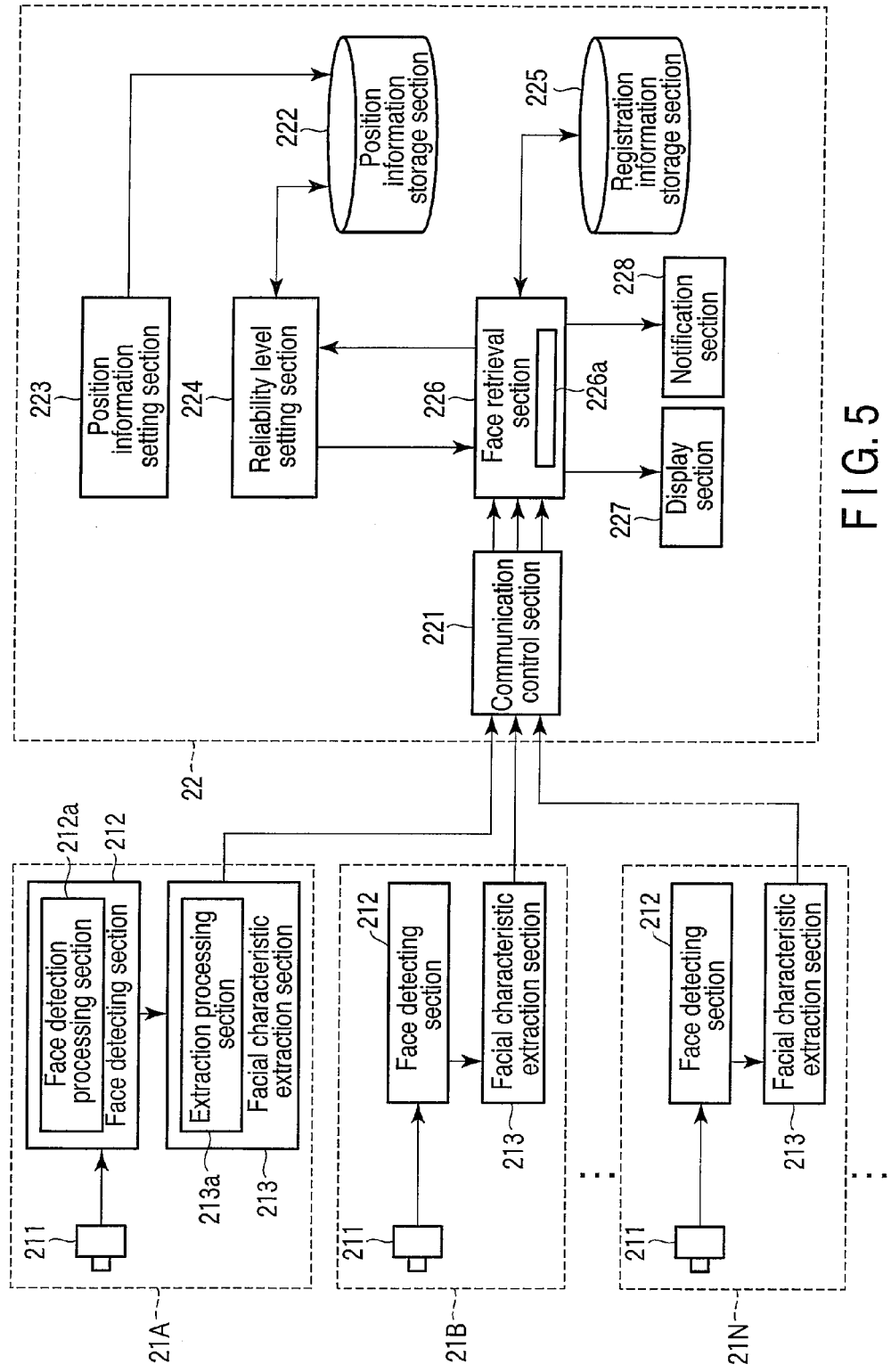
FIG. 5 is a block diagram schematically showing a configuration of a person retrieval apparatus according to a second embodiment.

Hereinafter, embodiments of the present invention will be explained with reference to the drawings.

First, a first embodiment of the invention will be explained.

FIG. 1 schematically shows a configuration of a person retrieval apparatus 1 according to the first embodiment. The person retrieval apparatus 1 is constituted of a plurality of terminal devices 11 (11A, 11B, ...) and one (or a plurality of) server device(s) 12 to which the terminal devices (11A, 11B, ...) are respectively connected.

Each of the terminal devices 11 (11A, 11B, ...) has a camera (for example, a video camera) 111, a face detecting section 112, and a facial characteristic extraction section 113. The configuration of each terminal device 11 (11A, 11B, ...) is realized by, for example, a control unit to which the camera 111 is connected. In this case, the control unit is realized by a configuration similar to a computer for performing image input/output processing and image processing. The face detecting section 112 and the facial characteristic extraction section 113 can be constituted as a function realized in that a CPU executes a processing program stored in a memory.

The camera 111 continuously takes an image of a monitoring region (specified image taking region) of each terminal device 11 (11A, 11B, ...). The camera 111 is constituted of, for example, a television camera using an image pickup device such as a CCD sensor. The camera 111 is placed in such a manner as to take an image containing a face of a person, who presents in the monitoring region of each terminal device 11 (11A, 11B, ...). For example, when an intruder in the monitoring region has been detected, the camera 111 continuously takes images of the intruder at a predetermined frame rate. The camera 111 supplies the taken images to the face detecting section 112 through an image interface (not shown) as needed. For example, the image taken by the camera 111 is sent to the face detecting section 112 as digital density image data of 512 pixels in a lateral direction by 512 pixels in a longitudinal direction.

The face detecting section 112 mainly performs processing for detecting the person's face from the image taken by the camera 111. In the example shown in FIG. 1, the face detecting section 112 has a face detection processing section 112a, a count processing section 112b, and the like.

The face detection processing section 112a performs processing for detecting a face region of a person, who is a target to be retrieved, from the image taken by the camera 111 (face detection processing). For example, the face detection processing section 112a first detects a predetermined plurality of characteristic points (for example, each point constituting the eyes, nose and mouth) in the images supplied from the camera 111. When the predetermined characteristic points are detected, the face detection processing section 112a determines that the face has been detected from the images. In this case, the face detection processing section 112a cuts out the face image into a predetermined size and shape (for example, m×n pixels) based on the position of each of the detected characteristic points (the face detection processing section 112a performs normalization processing of the face image). The face image obtained by the normalization processing is supplied to the facial characteristic extraction section 113. Note that the normalization processing of the face image may be performed by the facial characteristic extraction section 113 to be hereinafter described. In addition, for example a method described in a document (see Fukui and Yamaguchi, "Facial Feature Point Extraction Method Based on Combination of Shape Extraction and Pattern Matching", Shingakuron (D), Vol. J80-D-H, No. 8, pp. 2170-2177, 1997) can be applied to the face detection processing.

The count processing section 112b is used for counting the number of images, in which the face is detected, in the series of images continuously supplied from the camera 111. For example, the count processing section 112b counts the number of the images in which the face is detected in the series of images of a specified person. In addition, the count processing section 112b may count the number of the images in which the face is detected (namely, a ratio of the images in which the face is detected) with respect to a predetermined number of images continuously supplied from the camera 111. The relevant images and information (face region information) showing the face region detected by the face detection processing section 112a are supplied to the facial characteristic extraction section 113. Additionally, information indicating the number of the images in which the face is detected (face detection number) counted by the count processing section 112b is supplied to the facial characteristic extraction section 113.

The facial characteristic extraction section 113 mainly performs processing for extracting the facial characteristic information from the image of the face region detected by the face detecting section 112 and processing for estimating the quality of the extracted facial characteristic information. In the example shown in FIG. 1, the facial characteristic extraction section 113 has an extraction processing section 113a and a quality estimation section 113b. The quality estimation section 113b has a facial direction determination section 113c and an image quality determination section 113d.

The extraction processing section 113a performs processing for extracting information (facial characteristic information), which shows characteristics of the relevant person's face, from a face image group detected from the images continuously taken by the camera 111. For example, the extraction processing section 113a extracts density information in each face image, which has been detected from images in each frame by the face detecting section 112, as information indicating the facial characteristics (characteristic amount) to extract the facial characteristic information on the basis of the plurality of characteristic amounts extracted from the plurality of face images.

For example, the face images, which have been detected from the images in each frame by the face detecting section 112, are sequentially supplied to the extraction processing section 113a. Here, when the face detecting section 112 supplies the face image, which has been normalized into a predetermined size and shape (for example, m×n pixels), to the facial characteristic extraction section 113, the extraction processing section 113a determines the density information of the normalized face image as the characteristic amount of the relevant face image. The characteristic amount of each face image is information in which a density value in the face image of m×n pixels is represented as a vector (characteristic vector) of dimension m×n.

Further, in this embodiment, a subspace obtained from a moving image (a plurality of continuous images with a predetermined frame rate) is extracted as the facial characteristic information of the relevant person. The subspace is information calculated based on correlativity of each characteristic vector obtained from the image of each frame. Namely, the extraction processing section 113a calculates the characteristic vector of dimension m×n to each face image detected from the image in each frame. The extraction processing section 113a calculates a correlation matrix (or covariance matrix) to each characteristic vector obtained from each face image and thus obtains orthonormal vectors (eigenvector) by the well-known K-L development. The subspace selects k eigenvectors corresponding to an eigenvalue in descending order of the eigenvalue, and is expressed by using a set of the eigenvectors. Here, when the correlation matrix is represented by Cd, and the matrix of the eigenvectors is represented by Φ, a relation of the following formula (1) is defined as follows:

$$Cd = \Phi d \Lambda d \Phi dT \quad (1)$$

The matrix Φd of the eigenvectors can be calculated based on the formula (1). This information is the subspace (input subspace) as the facial characteristic information. Note that in the above calculation method, the subspace as the facial characteristic information is assumed to be detected from at least a predetermined number of characteristic vectors. Namely, when at least a predetermined number of the face image could not be detected, it is determined that the facial characteristic information has not been detected in the extraction processing section 113a.

Note that in the aftermentioned registration information storage section 125 of the server device 12, the subspace (dictionary subspace) extracted from a plurality of face images of each registrant (face image group for registration) is assumed to be registered as the facial characteristic information of each registrant by using the above-mentioned calculation method.

A quality estimation section 113b performs processing of estimating the quality of the facial characteristic information extracted by the extraction processing section 113a. The quality estimation section 113b estimates the quality of the facial characteristic information, which has been extracted by the extraction processing section 113a, on the basis of the number of images in which the face has been detected by the face detecting section 112 in the series of images taken by the camera 111, the facial direction in the face image detected by the face detecting section 112, the image quality of the face image detected by the face detecting section 112, and the like. The quality estimation section 113b is constituted to add quality information indicating the quality estimation to the facial characteristic information to transfer these information to the server device 12.

Meanwhile, the number of the images in which the face has been detected (face detection number) is counted by the count processing section 112b of the face detecting section 112. When the face detection number is determined as an evaluation criteria for the facial characteristic information, the quality estimation section 113b transfers information, which shows the face detection number supplied from the face detecting section 112 and is the quality information for the facial characteristic information extracted by the extraction processing section 113a, to the server device 12.

Additionally, in the quality estimation section 113b, the facial direction is determined by the facial direction determination section 113c. When the facial direction is determined as the evaluation criteria for the facial characteristic information, the quality estimation section 113b transfers information, which shows the facial direction determined by the facial direction determination section 113c and is the quality information for the facial characteristic information extracted by the extraction processing section 113a, to the server device 12.

In the facial direction determination section 113c, for example, the facial direction is estimated based on a positional relation of the plurality of characteristic points detected by the face detecting section 112. In this case, the facial direction determination section 113c can estimate the facial direction by corresponding a coordinate, which represents a position of each characteristic point (each point showing eyes, nose or mouth) detected by the face detecting section 112, to a 3D model. Meanwhile, the facial characteristic information is extracted from the plurality of face images. Therefore, an average value of the facial direction in each face image used for extraction of the facial characteristic information, the facial direction in a specified face image selected from each face image, which has been used for extraction of the facial characteristic information, or the like can be used as the facial direction to the facial characteristic information.

Meanwhile, in the quality estimation section 113b, the image quality of the face image is determined by the image quality determination section 113d. When the image quality of the face image is determined as the evaluation criteria for the facial characteristic information, the quality estimation section 113b transfers information, which shows the image quality determined by the image quality determination section 113d and is the quality information for the facial characteristic information extracted by the extraction processing section 113a, to the server device 12.

In the image quality determination section 113d, for example a saturation ratio (white jump ratio and black crash ratio) in each pixel value constituting the face image is determined as the image quality of the relevant face image. In this case, the image quality determination section 113d detects pixels having a saturated pixel value from all pixels constituting the relevant face image to calculate the ratio between the number of all the pixels and the number of the saturated pixels as the saturation ratio. In this case, the quality estimation section 113b transfers the saturation ratio in the face image, which is the quality information for the facial characteristic information extracted by the extraction processing section 113a, to the server device 12. Meanwhile, an average value of the image quality (saturation ratio) in each face image used for extraction of the facial characteristic information, the image quality (saturation ratio) in a specified face image selected from each face image, which has been used for extraction of the facial characteristic information, or the like can be used as the image quality (saturation ratio) in the facial characteristic information.

Next, a constitution of the server device 12 is explained.

As shown in FIG. 1, the server device 12 has a communication control section 121, a reliability level setting section 124, a registration information storage section 125, a face retrieval section 126, a display section 127, a notification section 128, and so on.

The server device 12 is realized by a constitution similar to a computer capable of performing input/output processing of an image and image processing. Namely, the server device 12 can be realized by a computer having a CPU, various types of memories, a communication interface, a display device, and the like. For example, an information processing function realized by the communication control section 121, the reliability level setting section 124, the face retrieval section 126, and the like can be constituted as a function realized in that the CPU performs a processing program stored in a memory.

The communication control section 121 is constituted of the communication interface for communication with each of the terminal devices 11, a control section for processing information received from each of the terminal devices 11, and so on. The communication control section 121 sequentially receives the facial characteristic information and quality information supplied from each of the terminal devices 11. When the communication control section 121 has received the facial characteristic information and the quality information from each of the terminal devices 11, the communication control section 121 transfers the facial characteristic information to the face retrieval section 126, and, at the same time, transfers the quality information to the reliability level setting section 124. At this time, identification information and the like for corresponding the facial characteristic information and the quality information to each other is given to these information.

The reliability level setting section 124 sets the reliability level based on the quality information. Namely, when the quality information from each of the terminal devices 11 is given to the reliability level setting section 124 through the communication control section 121, the reliability level setting section 124 determines the reliability level to the corresponding facial characteristic information on the basis of the given quality information. When the reliability level to the facial characteristic information is determined, the reliability level setting section 124 supplies information indicating the reliability level to the face retrieval section 126. Here, the reliability level represents a priority for performing the face retrieval processing. Thus, the facial characteristic information is subjected to the face retrieval (face verification) processing in descending order of the reliability level. For example, the reliability level is set in the order in which the quality of the facial characteristic information is favorable (in a suitable order for the face retrieval processing), whereby as the reliability level is higher, it is predicted that the accuracy of the face retrieval processing is higher, while as the reliability level is lower, it is predicted that the accuracy of the face retrieval processing is deteriorated.

In the reliability level setting section 124, it is possible to set the reliability level by various methods in accordance with the kinds of the quality information.

For example, when a face detection number as the quality information is given, the value of the reliability level is set to correspond to the face detection number. As a method for setting the value of the reliability level, it is considered to set a high reliability level in descending order of the face detection number or in ascending order thereof.

When the face detection number is large, it is predicted that the relevant person turns the face to the camera 111 with being conscious of the camera 111. It is considered that such a person is highly likely to be a registrant. Additionally, in general, as the face detection number is larger, the favorable facial characteristic information, which has a high possibility of succeeding the retrieval in the face retrieval processing, is easily extracted. Therefore, when the facial characteristic information, which is highly likely that of the registrant, is desired to be preferentially processed, or when the favorable facial characteristic information is desired to be preferentially processed, it is preferable that the high reliability level is set in descending order of the face detection number.

Meanwhile, when the face detection number is small, it is predicted that the relevant person is not conscious of the camera 111 or the person does not consciously turn his face to the camera 111. It is considered that such a person is highly likely to be a prowler except the registrants. Therefore, when the facial characteristic information, which is highly likely that of a person such as a prowler except the registrants, is desired to be preferentially processed, or when the facial characteristic information in which there is a high possibility of failure in the retrieval is desired to be preferentially processed, it is preferable that the high reliability level is set in ascending order of the face detection number.

When the information indicating the facial direction as the quality information is given, the value of the reliability level is set to correspond to the facial direction. In this case, as a method for setting the value of the reliability level, it is considered to set a high reliability level in order in which the facial direction is close to the front or in order in which the facial direction is far from the front.

When the facial direction is close to the front, it is predicted that the relevant person turns the face to the camera 111 with being conscious of the camera 111. It is considered that such a person is highly likely to be the registrant. Additionally, in general, the registration processing is performed by using the face image taken in such a state that a face is facing the front. Therefore, as the facial direction is closer to the front, the facial characteristic information is considered to be favorable because of having a high possibility of succeeding the retrieval in the face retrieval processing. Thus, when the facial characteristic information, which is highly likely that of the registrant, is desired to be preferentially processed, or when the facial characteristic information which has a high possibility of succeeding the retrieval is desired to be preferentially processed, it is preferable that the high reliability level is set in order in which the facial direction is close to the front.

Meanwhile, when the facial direction is far from the front, it is predicted that the relevant person is not conscious of the camera 111 or the person does not consciously turn his face to the camera 111. It is considered that such a person is highly likely to be a prowler except the registrants. Therefore, when the facial characteristic information, which has a high possibility of being that of a person such as a prowler except the registrants, is desired to be preferentially processed, or when the facial characteristic information in which there is a high possibility of failure in the retrieval is desired to be preferentially processed, it is preferable to set the high reliability level in order in which the facial direction is far from the front.

Meanwhile, when the information indicating the image quality as the quality information is given, the value of the reliability level is set to correspond to the image quality. For example, when the saturation ratio of the pixel value in the face image is used as the quality information, as a method for setting the value of the reliability level, it is considered to set a high reliability level in ascending order of the saturation ratio of the pixel value or in descending order thereof.

The image quality of the face image (saturation ratio of the pixel value) is mainly influenced by an image taking environment such as an illumination. Additionally, as the image quality of the face image is more favorable, the facial characteristic information is considered to be favorable because of having a high possibility of succeeding the retrieval in the face retrieval processing. Therefore, in general, it is assumed to perform a method of setting a high reliability level in order from high to low image quality (in order from low to high saturation ratio of the pixel value). However, operationally, when the facial characteristic information in which there is a high possibility of failure in the retrieval is desired to be preferentially processed, it is also possible to set a high reliability level in order from bad to good image quality (in order from high to low saturation ratio of the pixel value).

The information of each registrant as a dictionary data for retrieval is stored in the registration information storage section 125. Here, at least the facial characteristic information, which is the dictionary data of each registrant and is extracted from the face image group for registration of each registrant, is stored in the registration information storage section 125. Namely, the dictionary data containing the facial characteristic information of each registrant is stored in the registration information storage section 125 by the registration processing performed for each registrant. For example, in the registration processing, the server device 12 obtains the face image group for registration of each registrant and individual information of them. When the face image group for registration is obtained by the server device 12, with respect to the obtained face image group for registration, the server device 12 calculates a dictionary subspace as the facial characteristic information (facial characteristic information for registration) by the above-mentioned method for calculating the facial characteristic information. When the dictionary subspace as the facial characteristic information for registration is calculated, the server device 12 stores the calculated facial characteristic information for registration in the registration information storage section 125 so as to correspond it to the individual information of the relevant registrant. The facial characteristic information of each registrant, which has been stored in the registration information storage section 125 by the above registration processing, is used for the retrieval processing performed by the face retrieval section 126.

The face retrieval section 126 performs the face retrieval processing for retrieving information, which is the most similar to the information given from each of the terminal devices 11, from among the registrants' information stored in the registration information storage section 125. In addition, the face retrieval section 126 has a memory 126a having a function of storing at least a plurality of facial characteristic information (input facial characteristic information) supplied from each of the terminal devices 11.

As the face retrieval processing performed by the face retrieval section 126, in the facial characteristic information (dictionary facial characteristic information) of each registrant stored in the registration information storage section 125, predetermined numbers of registrants (for example, the top ten) corresponding to the dictionary facial characteristic information are retrieved in descending order of a similarity to the facial characteristic information (input facial characteristic information) given from each of the terminal devices 11. Namely, when the input facial characteristic information is given to the face retrieval section 126, the face retrieval section 126 calculates the similarity of the dictionary facial characteristic information to the relevant input facial characteristic information.

As a method of calculating the similarity between the input facial characteristic information and the dictionary facial characteristic information, a mutual subspace method can be applied. The mutual subspace method for calculating the similarity between the input subspace as the input facial characteristic information and the dictionary subspace as the dictionary facial characteristic information is described in a document (see, Yamaguchi, Fukui and Maeda, "Face Recognition System using Temporal Image Sequence", Shingakugihou PR, MU97-50, pp. 17-23, 1997-06).

When the similarity of each dictionary facial characteristic information to the input facial characteristic information is calculated, the face retrieval section 126 determines the registrants, who correspond to predetermined numbers (for example, the top ten) of dictionary facial characteristic information, in descending order of the calculated similarities, as the retrieval result. Additionally, a threshold value (threshold value for identification to the calculated similarities) for uniquely specifying the retrieval result may be set in the face retrieval section 126. In this case, when the largest one in the calculated similarities is not less than the threshold value for identification, the face retrieval section 126 may determines the registrant, who corresponds to the dictionary facial characteristic information having the maximum similarity, as the retrieval result. Further, a threshold value for selection of the retrieval results (threshold value for selection to the calculated similarities) may be set in the face retrieval section 126. In this case, the face retrieval section 126 may determine a registrant, who corresponds to the dictionary facial characteristic information having the similarity of not less than the selection threshold value in the top ten of the similarities, as the retrieval result.

The above-mentioned face retrieval processing is performed to one input facial characteristic information. The input facial characteristic information is continually given from each of terminal devices 11 to the server device 12. Therefore, when the plurality of input facial characteristic information are given at the same time, the face retrieval section 126 should determine the order of the face retrieval processing performed to each input facial characteristic information. In this case, the face retrieval section 126 determines the order of the face retrieval processing performed to each input facial characteristic information, or determines the necessity of the processing on the basis of the reliability level set in the reliability level setting section 124. For example, it is considered that the face retrieval processing is performed to the input facial characteristic information in order of a high reliability level, or the face retrieval processing is not performed to the input facial characteristic information having the reliability level less than a predetermined threshold value.

FIG. 2 is a diagram showing a control example of the order of the face retrieval processing in accordance with reliability level.

In the example shown in FIG. 2, the order of the face retrieval processing is arranged in descending order of the reliability level. This reliability level is information unrelated to an input order (time series) of each input facial characteristic information. Thus, the face retrieval section 126 performs the face retrieval processing in the descending order of the reliability level, regardless of the input order of each input facial characteristic information. The example in FIG. 2 shows that the face retrieval processing is preferentially performed to the input facial characteristic information with a reliability level of 0.9. For example, in the state shown in FIG. 2, when the input facial characteristic information with a reliability level of 0.7 is given to the face retrieval section 126 while the face retrieval processing is performed to the input facial characteristic information with a reliability level of 0.9, the face retrieval section 126 performs the face retrieval processing on newly given input facial characteristic information with a reliability level of 0.7, prior to the input facial characteristic information with a reliability level of not more than 0.6 waiting for the face retrieval processing.

The display section 127 display the face retrieval result obtained by the face retrieval section 126. The display section 127 is constituted of a liquid crystal display, a CRT display, or the like, for example. FIG. 3 shows a display example of the result of the face retrieval processing. In the example shown in FIG. 3, as the face retrieval result, the face image (input face image) taken by the camera 111 is displayed in the display section 127, and the face images (registration face images) of the top ten of the registrants are displayed therein in descending order of the similarity to the input face image.

The notification section 128 performs notification in accordance with the face retrieval result obtained by the face retrieval section 126. The notification section 128 is constituted of an alarm, a mobile terminal device, or the like. As the notification method with the alarm in the notification section 128, for example, it is assumed that when a specified registrant (for example, registrants beforehand set as a person for whom the alarm should be sounded) is contained in the face retrieval result, the notification section 128 alerts administrators by sounding the alarm.

Next, a processing example in the person retrieval apparatus 1 will be described.

FIG. 4 is a flowchart for explaining a flow of the processing in the person retrieval apparatus 1.

First, when a person has entered the image taking region of the camera 111 of the terminal device 11A (step S10, YES), the camera 111 of the terminal device 11A takes an image containing the relevant person's face. The image containing the person's face taken by the camera 111 is supplied to the face detecting section 112 (step S11). When the image containing the person's face is obtained, the face detection processing section 112a of the face detecting section 112 performs the processing of detecting the face from the image (step S12). Meanwhile, the count processing section 112b of the face detecting section 112 counts up the face detection number in each detection of the face image from the obtained image (step S13). The processings from the steps S11 to S13 are repeated until for example a predetermined number of images are obtained (step S14, NO).

Namely, the face detecting section 112 sequentially obtains a plurality of images continuously taken by the camera 111 to perform the face detection processing on these images. The number of the images in which the face has been detected by such a face detection processing is counted by the count processing section 112b. In this embodiment, the face detecting section 112 obtains a predetermined number of images from the camera 111 taking a specified person. Therefore, the count processing section 112b counts the number of images, in which the face has been detected, from among the obtained predetermined number of images. However, in order to extract the facial characteristic information as the subspace, at least a predetermined number of the face images are required. Therefore, in the step S14, the processings from the steps S11 to S13 may be repeated until the number of the images in which the face image has been detected reaches the predetermined number. In this case, the count processing section 112b counts the number of the image obtained from the camera 111 and the number of the images in which the face has been detected, whereby a ratio of the image in which the face has been detected can be determined.

When the predetermined number of the images is obtained from the camera 111 (step S14, YES), the face detecting section 112 supplies each detected face image and information indicating the number of the face images to the facial characteristic extraction section 113. The facial characteristic extraction section 113 performs extraction processing for the subspace as the facial characteristic information performed by the extraction processing section 113a (step S15) and quality estimation processing performed by the quality estimation section 113b (step S16).

The extraction processing section 113a calculates the characteristic amount (characteristic vector), which is obtained from the density value of each face image and the like, from each face image. When the characteristic vector of each face image is calculated, the extraction processing section 113a integrates the characteristic vector of each face image to extract the subspace (input subspace) as the facial characteristic information.

Meanwhile, the quality estimation section 113b estimates the quality of the facial characteristic information (input subspace), which has been extracted by the extraction processing section 113a, on the basis of the face detection number counted by the count processing section 112b, the facial direction determined by the facial direction determination section 113c, or the image quality determined by the image quality determination section 113d. For example, if only the face detection number is the estimation criteria, the quality estimation section 113b determines information, which shows the face detection number counted by the count processing section 112b, as the quality information. Meanwhile, if only the facial direction is the estimation criteria, the quality estimation section 113b determines information, which shows the facial direction determined by the facial direction determination section 113c, as the quality information. If only the image quality is the estimation criteria, the quality estimation section 113b determines information, which shows the image quality of the face image determined by the image quality determination section 113d, as the quality information. If the combination of any or all of the face detection number, the facial direction, and the image quality is the estimation criteria, the quality estimation section 113 determines information, which shows various information as the estimation criteria, as the quality information.

When the facial characteristic information (input subspace) is extracted by the extraction processing section 113a, and, at the same time, when the quality information for the facial characteristic information is obtained by the quality estimation section 113b, the facial characteristic extraction section 113 transfers the characteristic information and the quality information to the server device 12 through an interface (not shown) in such a state that these information are corresponded to each other (step S17).

Each of the terminal devices 11 appropriately transfers the facial characteristic information, which is extracted from the image taken by the camera 111, and the quality information, which corresponds to the facial characteristic information, by the processings from the steps S10 to S17.

The server device 12 receives the facial characteristic information and the quality information corresponding thereto from each of the terminal devices 11, as needed (step S20). For example, when the facial characteristic information and the quality information corresponding thereto are sent from the terminal device 11A, the server device 12 receives the facial characteristic information and the quality information by the communication control section 121. When the facial characteristic information and the quality information are received by the communication control section 121, the communication control section 121 supplies the quality information to the reliability level setting section 124, while supplies the facial characteristic information to the face retrieval section 126. At this time, the quality information and the facial characteristic information are corresponded to each other with the aid of the identification information or the like.

When the quality information is given from the communication control section 121 to the reliability level setting section 124, the reliability level setting section 124 sets the reliability level on the basis of the quality information (step S21). The reliability level is information indicating a priority in the face retrieval processing for the facial characteristic information. As mentioned above, the face retrieval processing based on the quality information to be preferentially performed is determined in response to the operation configuration of the person retrieval device 1. Namely, the reliability level setting section 124 decides the priority degree of the face retrieval processing on the corresponding facial characteristic information, on the basis of the quality information, thereby to determine the decision result as the reliability level. When the reliability level based on the quality information is determined, the reliability level setting section 124 supplies the relevant reliability level to the face retrieval section 126 for the purpose of setting the reliability level in the corresponding facial characteristic information.

In the face retrieval section 126, the facial characteristic information supplied from the communication control section 121 and the reliability level supplied from the reliability level setting section 124 are stored in a memory (not shown) so as to correspond the facial characteristic information and the reliability level to each other (step S22). For example, in the face retrieval section 126, the facial characteristic information supplied from the communication control section 121 is temporarily stored in the memory 126a. When the reliability level, which is determined based on the quality information corresponding to the facial characteristic information stored in the memory 126a, is supplied from the reliability level setting section 124 to the face retrieval section 126, the face retrieval section 126 stores the reliability level in the memory 126a so as to correspond the reliability level to the facial characteristic information. In addition, as shown in FIG. 2, the facial characteristic information may be rearranged and stored in the memory 126a in descending order of the reliability level (in priority order of the face retrieval processing).

The processings from the steps S20 to S22 are performed as needed when the facial characteristic information and the quality information are received from the terminal device 11. Namely, the processings from the steps S10 to S17 in the terminal device 11 and the processings from the steps S20 to S22 in the server device 12 are performed as a series of processing when a person's face is taken by each of the cameras 111.

Meanwhile, the processings from the aftermentioned steps S23 to S26 are performed in the server device 12, in parallel to the processings from the steps S20 to S22. The aftermentioned steps S23 to S26 show a processing procedure in the face retrieval processing for the facial characteristic information, which is accumulated in the memory 126a in the face retrieval section 126 by the processing until step S22. Namely, the server device 12 performs the processing of receiving the facial characteristic information from each of the terminal devices 11 as needed, and, at the same time, performs the face retrieval processing on the received facial characteristic information in parallel.

The face retrieval section 126 in the server device 12 selects the facial characteristic information with the largest reliability level of the facial characteristic information stored in the memory 126a at every finish of the face retrieval processing or at every storage of the facial characteristic information in the memory 126a (step S23). When the face retrieval section 126 selects the facial characteristic information with the largest reliability level, it determines whether the reliability level corresponding to the selected facial characteristic information is not less than a predetermined threshold value (step S24). This threshold value is used for determination of the necessity of the face retrieval processing on the facial characteristic information. Namely, this threshold value is a reference value for determining the necessity of the face retrieval processing on the basis of the reliability level. Therefore, when the reliability level corresponding to the selected facial characteristic information is determined to be less than the predetermined threshold value by the determination in the face retrieval section 126 (step S24, NO), the face retrieval section 126 finishes the face retrieval processing.

When the reliability level is determined to be not less than the predetermined threshold value by the determination in the face retrieval section 126 (step S24, YES), the face retrieval section 126 performs the face retrieval processing on the selected facial characteristic information (step S25). In the face retrieval processing, as mentioned above, for example the top ten of the registrants are retrieved in descending order of the similarity to the selected facial characteristic information. The result of the face retrieval processing is output to the display section 127 and the notification section 128 (step S26). Thereby, for example a retrieval result shown in FIG. 3 is displayed in the display section 127.

When the retrieval result to the selected facial characteristic information is output, the face retrieval section 126 determines whether unretrieved facial characteristic information is stored in the memory 126a (step S27). When it is determined that the unretrieved facial characteristic information is stored in the memory 126a on the basis of the determination in the face retrieval section 126 (step S27, YES), the face retrieval section 126 returns to the step S23 and then to perform the face retrieval processing on the facial characteristic information with a second highest reliability level. When it is determined that the unretrieved facial characteristic information is not stored in the memory 126a on the basis of the determination in the face retrieval section 126, the face retrieval section 126 is held in a standby state until the facial characteristic information is newly stored in the memory 126a.

As described above, in the first embodiment, the reliability level, which corresponds to the quality of the facial characteristic information extracted from the input image, is set, and the retrieval processing is performed in descending order of the reliability level. Thereby, according to the first embodiment, the retrieval processing in accordance with the facial characteristic information can be efficiently performed. Especially, when the face retrieval processing on each facial characteristic information item extracted from the images taken by a plurality of cameras is performed in a concentrated manner by the server device or the like, the retrieval processing can be optimized or streamlined by the above processing procedure.

Next, a second embodiment is explained.

FIG. 5 schematically shows a constitution of a person retrieval apparatus 2 according to the second embodiment. The person retrieval apparatus 2 is constituted of a plurality of terminal devices 21 (21A, 21B, . . . ) and one (or a plurality of) server device(s) 22.

Each of the terminal devices 21 (21A, 21B, . . . ) has a camera (for example, a video camera) 211, a face detecting section 212, and a facial characteristic extraction section 213. Each constitution of the terminal devices 21 (21A, 21B, . . . ) is realized by, for example, a control unit to which the camera 211 is connected. In this case, the control unit is realized by a constitution similar to a computer for performing image input/output processing and image processing. The face detecting section 212 and the facial characteristic extraction section 213 can be constituted as a function realized in that a CPU performs a processing program stored in a memory.

The camera 211 is constituted in a similar manner to the camera 111 explained in the first embodiment. However, the image taking region is specified beforehand in the camera 211. The image taking region of the camera 211 is stored in a server device 22 to be hereinafter described.

The face detecting section 212 has the face detection processing section 212a constituted in a similar manner to the face detection processing section 112a explained in the first embodiment. The face detection processing section 212a detects the face image from the image obtained by the face detection processing similar to that by the face detection processing section 112a. Namely, the face detecting section 212 sequentially obtains the images taken by the camera 211. In the face detecting section 212, the face image of a person who is a target to be retrieved is detected from the obtained images by the face detection processing section 212a. The face detecting section 212 supplies the face image detected by the face detection processing section 212a to the facial characteristic extraction section 213.

The facial characteristic extraction section 213 has an extraction processing section 213a constituted in a similar manner to the extraction processing section 113a explained in the first embodiment. The extraction processing section 213a extracts facial characteristic information (input subspace) from a face image group, which is detected by the face detecting section 212, by the extraction processing for the facial characteristic information performed in a similar manner to that in the extraction processing section 113a. Namely, the facial characteristic extraction section 213 sequentially obtains the face image group, which has been detected by the face detecting section 212, from the plurality of images continuously taken by the camera 211. In the facial characteristic extraction section 213, the extraction processing section 213a extracts the facial characteristic information as the input subspace from the face image group given from the face detecting section 212. The facial characteristic extraction section 213 transfers the facial characteristic information, which has been extracted by the extraction processing section 213a, to the server device 22. The facial characteristic information is transferred to the server device 22 in such a state that at least the information indicating the relevant terminal device or camera (discrimination information of the terminal device or camera) is given thereto.

Next, the constitution of the server device 22 is explained. As shown in FIG. 5, the server device 22 has a communication control section 221, a position information storage section 222, a position information setting section 223, a reliability level setting section 224, a registration information storage section 225, a face retrieval section 226, a display section 227, a notification section 228, and so on.

The server device 22 is released by a constitution similar to a computer capable of performing image input/output processing and image processing. Namely, the server device 22 can be realized by a computer having a CPU, various types of memories, a communication interface, a display device, and so on. For example, an information processing function realized by the communication control section 221, the position information setting section 223, the reliability level setting section 224, the face retrieval section 226, and the like can be constituted as a function realized in that the CPU performs a processing program stored in a memory.

The communication control section 221 is constituted of a communication interface for communication with each of the terminal devices 21, a control section for processing information received from each of the terminal devices 21, and the like. The communication control section 221 sequentially receives the facial characteristic information and supplied from each of the terminal devices 21. In the person retrieval apparatus of the second embodiment, discrimination information is given to the facial characteristic information supplied from each of the terminal devices 21. The discrimination information shows the terminal device 21, which is a sending source of the relevant facial characteristic information, or the camera 211 for taking the face image from which the relevant facial characteristic information is extracted. The communication control section 221 supplies the facial characteristic information, to which the above discrimination information is given, to the face retrieval section 226.

The position information indicating a position (image taking region) where the camera 211 of each of the terminal devices 21 takes an image is stored in the position information storage section 222. The position information is stored therein so as to correspond to the discrimination information for distinguishing each of the terminal devices 21 or each of the cameras 211. Additionally, the information (position relation information) showing a relation between the position of the relevant camera and an image-taking position of other cameras is also stored in the position information storage section 222 so as to correspond to the discrimination information in each camera. Further, the position information storage section 222 may store information, which is attention information indicating that a specified camera is a camera to be paid attention, so as to correspond the information to the position information of the specified camera, and besides may store information, which is the attention information indicating an attention level, so as to correspond the information to the position information of each camera.

The position information setting section 223 registers information in the position information storage section 222, or updates the information. When a camera is newly placed, or when the position of the existing camera is changed, the position information setting section 223 registers or updates the position information of the relevant camera and the position relation information in the position information storage section 222. At that time, the position information setting section 223 updates the position relation information of other cameras.

For example, an operator inputs the position information of the newly placed camera or the position information of a camera of which position has been changed, by operating an operation section (not shown). When the operator inputs the position information of the camera, the position information setting section 223 determines the position relation information of each camera on the basis of the input position information of the camera (position information of the camera which has been newly registered or updated). Thereby, the position information setting section 223 can store (set) the position relation information of each camera in the position information storage section 222, in addition to the new registration or updating of the position information of the camera.

Meanwhile, when a specified camera is the camera to be paid attention, that is, when the face retrieval processing on the face image taken by the specified camera is desired to be preferentially performed, the position information setting section 223 stores the attention information, which shows that the specified camera is the camera to be paid attention, in the position information storage section 222 so as to correspond the attention information to the position information of the camera to be paid attention. When the attention level (priority level) is set in each camera, the position information setting section 223 may store the attention information indicating the attention level of each camera in the position information storage section 222 so as to correspond the attention information to the position information of each camera.

The reliability level setting section 224 sets the reliability level on the basis of various kinds of information corresponding to each terminal device or camera. Namely, the reliability level setting section 224 obtains information (the attention information, the position relation information, or the like) from the position information storage section 222. This information is corresponded to the camera specified by the discrimination information indicating the terminal device 21 or the camera 211. When the reliability level setting section 224 obtained the information corresponded to the camera from the position information storage section 222, it sets the reliability level on the basis of the information.

In this embodiment, the face retrieval section 226 obtains the facial characteristic information to which the discrimination information indicating the camera supplied from each of the terminal devices 21 is given. In this case, the discrimination information given to the facial characteristic information is supplied from the face retrieval section 226 to the reliability level setting section 224. When the discrimination information is given from the face retrieval section 226 to the position information setting section 223, the position information setting section 223 obtains the position information of the camera, which is corresponded to the discrimination information, from the position information storage section 222. When the reliability level setting section 224 obtained the information corresponded to the camera, it determines the reliability level to the facial characteristic information, to which the discrimination information is given, on the basis of a predetermined setting method to be hereinafter described. When the reliability level is determined, the reliability level setting section 224 supplies the reliability level and the discrimination information to the face retrieval section 226, whereby sets the reliability level to the facial characteristic information to which the discrimination information is given.

There are various methods of setting the reliability level in the reliability level setting section 224. For example, it is considered that the reliability level is set based on the attention information, which is stored in the position information storage section 222 so as to correspond to each camera. In addition, it is also considered that the reliability level is set based on the position relation information, which is stored in the position information storage section 222 so as to correspond to each camera. The method of setting the reliability level in the reliability level setting section 224 will be described in detail hereinafter.

The face retrieval section 226 has a function of performing the face retrieval processing based on similarity calculation by a mutual subspace method with use of the input characteristic information (input subspace) and each dictionary facial characteristic information (dictionary subspace), in a similar manner to the face retrieval section 126 explained in the first embodiment. In addition, the face retrieval section 226 has a function of performing the face retrieval processing in the order based on the reliability level given from the reliability level setting section 224, in a similar manner to the face retrieval section 126. However, the facial characteristic information to which the discrimination information is given is supplied from each of the terminal devices 21 to the face retrieval section 226 through the communication control section 221. For the purpose of setting the reliability level to the facial characteristic information supplied from each of the terminal devices 21, the face retrieval section 226 sends the discrimination information given to the facial characteristic information to the reliability level setting section 224. Thereby, the reliability level to each facial characteristic information from each of the terminal devices 21 is set by the reliability level setting section 224 through the face retrieval section 226.

The registration information storage section 225 stores the information of each registrant as the dictionary data for retrieval in a similar manner to the registration information storage section 125 explained in the first embodiment. Namely, as with the registration information storage section 125, at least the facial characteristic information extracted from the face image group for registration of each registrant is stored in the registration information storage section 225.

The display section 227 is constituted in a similar manner to the display section 127 explained in the first embodiment. Namely, the display section 227 displays the face retrieval result obtained by the face retrieval section 226, as with the display section 127. The notification section 228 is constituted in a similar manner to the notification section 128 explained in the first embodiment. Namely, the notification section 228 performs notification according to the face retrieval result obtained by the face retrieval section 226, as with the notification section 128.

Next, a method of setting the reliability level in the reliability level setting section 224 will be described.

As mentioned above, as an example of a method of setting the reliability level in the reliability level setting section 224, a method of setting the reliability level based on the attention information and that based on the position relation information will be described.

The example of the method of setting the reliability level based on the attention information is first explained.

The attention information shows the attention level as the priority level in the face retrieval processing on the facial characteristic information, which is extracted from the face image taken by each camera. In this case, for example, a case in which a security level in the image taking region of each camera is different from each other is assumed. When the attention information is stored to correspond to each camera, the reliability level setting section 224 sets the reliability level in accordance with the attention level, which is the attention information corresponding to the camera having taken the face image. In this case, the face retrieval section 226 performs the face retrieval processing in descending order of the reliability level, that is, the attention level.

Namely, when the security level in the image taking region of each camera is different from each other, the attention level according to the security level is stored as the attention information corresponding to each camera. Thereby, the reliability level setting section 224 allows the face retrieval section 226 to perform the face retrieval processing in the order according to the security level in the image taking region of each camera.

In the attention information, the attention level may be rendered high in the camera in the image taking region to be most preferentially subjected to the face retrieval processing. Such a constitution is assumed to be applied to a case in which there is a region with a high security level such as a region near an entrance or exit or a case in which there is a region requiring the higher-speed response (face retrieval result) than other region (i.e., a region to be preferentially subjected to the face retrieval processing).

Namely, when there is the region requiring the preferential processing or the high-speed response, the attention level as the attention information corresponded to each camera for taking these regions is increased beforehand. Thereby, the reliability level setting section 224 allows the face retrieval section 226 to usually preferentially perform the face retrieval processing on the facial characteristic information extracted from the face image taken by a specified camera.

The example of setting the reliability level based on the position relation information is explained.

The position relation information shows the position relation of the image taking regions of cameras to the image taking region of a certain camera. According to the position relation information, the reliability level setting section 224 can dynamically set the reliability level as the priority level in the processing on the image taken by the camera adjacent to a certain camera, on the basis of the processing result to the image taken by the relevant camera. Namely, in the person retrieval apparatus 2, when the face image has been detected from the image taken by a certain camera, it is possible to increase the reliability level as the priority level in the processing on the image taken by the camera adjacent to the relevant camera, on the basis of the position relation information corresponding to the relevant camera.

For example, when the face image is detected from the image taken by a certain camera, the reliability level setting section 224 temporarily increases the attention level as the attention information corresponding to the camera adjacent to the relevant camera, whereby the above constitution can be realized. According to such a constitution, every when the face image is detected from the image taken by each camera, the reliability level setting section 224 sequentially sets the reliability level to the facial characteristic information, which has been extracted from the image taken by the adjacent camera, at a relatively high level. Thereby, every when the face image is detected from the image taken by each camera, the face retrieval section 226 can preferentially perform the face retrieval processing on the facial characteristic information, which has been extracted from the image taken by the adjacent camera.

Further, in the person retrieval apparatus 2, it is also possible to increase the reliability level to the camera adjacent to a certain camera in accordance with the result of the face retrieval processing on the facial characteristic information, which has been extracted from the image taken by the relevant camera. For example, when the face retrieval processing on the facial characteristic information, which has been extracted from the image taken by a certain camera, is failed (for example, when the maximum similarity is not more than a predetermined value), the reliability level to the camera adjacent to the relevant camera can be increased by the reliability level setting section 224. According to such a constitution, when the face retrieval processing in accordance with the facial characteristic information, which has been extracted from the image taken by a certain camera, is failed, the face retrieval apparatus 2 preferentially performs the face retrieval processing on the facial characteristic information, which is extracted from the image taken by the adjacent camera, whereby to be able to preferentially retrieve the target person.

In addition, it is possible to set the reliability level by combining the attention information and the position relation information. For example, in facilities having a plurality of cameras, it is desired to strictly monitor the people going in and out, especially the movement (behavior) of prowlers. Such a demand can be realized by most preferentially performing the face retrieval processing on the image of the vicinity of the entrance and exit, and, at the same time, by preferentially performing the face retrieval processing on the image of each position in the facilities with respect to a person (for example, who is suspected to be a prowler) to whom the face retrieval processing was failed.

The above constitution can be realized by increasing beforehand the attention level in the position relation information indicating the position relation between each camera and that in the attention information corresponded to a specified camera (for example, a camera for taking an image of the vicinity of an entrance and exit). In this case, the reliability level setting section 224 increases the reliability level of the facial characteristic information, which has been extracted from the image taken in the image taking region near the entrance and exit, for the purpose of preferential performing of the face retrieval processing. In addition to that, when the face retrieval processing on the facial characteristic information, which has been extracted from the image taken by a certain camera, was failed, the reliability level setting section 224 sets the reliability level to the facial characteristic information, which has been extracted from the images taken by each camera adjacent to the relevant camera, such that the reliability level becomes relatively high.

FIG. 6 is a diagram showing a placement example of a plurality of cameras 211A to 211H.

Here, a setting example of the reliability level in case in which the plurality of cameras 211A to 211H are placed as shown in FIG. 6 is explained.

In the example shown in FIG. 6, each of the cameras 211A to 211H are respectively placed at points A to H as the image taking regions. When the point A is the vicinity of an entrance, and besides when the point H is the vicinity of an exit, it is considered that a person entering from the entrance at the point A sequentially passes the points adjacent to each other, and thus reaches the point H. Therefore, when the cameras are placed shown in FIG. 6, it can be predicted that a person, taken by a certain camera, is taken by which of the cameras. As the example, the points B, G and H are adjacent to the point E, whereby it can be predicted that a person having passed through the point E will appear in any of the points B, G and H. Namely, it is predicted that a person taken by the camera 211E, for taking the point E as the image taking region, will appear in the image taken by the camera 211B for taking the point B, the camera 211G for taking the point G, or the camera 211H taking the point H.

In the case that the cameras are placed in such a manner, there is exemplified a method of setting the reliability level on the basis of the position relation information between each camera. Note that in the position information storage section 222, at least information of each camera, for taking each point adjacent to each other, is stored as the position relation information.

For example, when the face retrieval processing on the facial characteristic information, which has been extracted from the image of the point E taken by the camera 211E, was failed (when the maximum similarity is not more than a predetermined value), the reliability level setting section 224 specifies each of the cameras 211B, 211G and 211H, which respectively take the points B, G and H adjacent to the point E, on the basis of the position relation information corresponded to the camera 211E. Thereafter, the reliability level setting section 224 sets the reliability level to the facial characteristic information, which is extracted from the image taken by the cameras 211B, 211G and 211H, such that the reliability level becomes relatively high.

Thereby, even when the face retrieval processing on a person was failed, it is possible to preferentially perform the face retrieval processing on the facial characteristic information, which is obtained from the image taken by the camera for taking the point as the image taking region where the person is expected to appear next. As a result, in the person retrieval apparatus 2, when the face retrieval processing using the image taken at a certain point was failed, the person to be retrieved can be preferentially retrieved at another point where the person will appear next.

Meanwhile, when the person retrieval processing is performed in an area having an entrance and an exit, the reliability level setting section 224 can sequentially relatively increase the reliability level at the point adjacent to each other in a direction from the entrance toward the exit, on the ground that it is predicted that a person moves from the entrance to the exit in the area. Namely, the person retrieval apparatus 2 can uniformly increase the reliability levels at the points adjacent to each other, and, at the same time, increase the reliability levels on the basis of a value weighted according to the operation situation including the predictable behavior of a person, the distance between the adjacent points, or the condition of each adjacent point.

Further, the attention information to be most preferentially subjected to the face retrieval processing may be stored in the person retrieval apparatus 2 so as to correspond to the camera for taking the vicinity of the entrance or exit as the image taking region. In this case, the person retrieval apparatus 2 most-preferentially performs the face retrieval processing on the facial characteristic information obtained from the image of the vicinity of the entrance or exit. Such a constitution can be applied to a case in which coming into an area and going therefrom is desired to be most-preferentially monitored.

Next, a processing example in the person retrieval apparatus 2 is explained.

Figure 7:
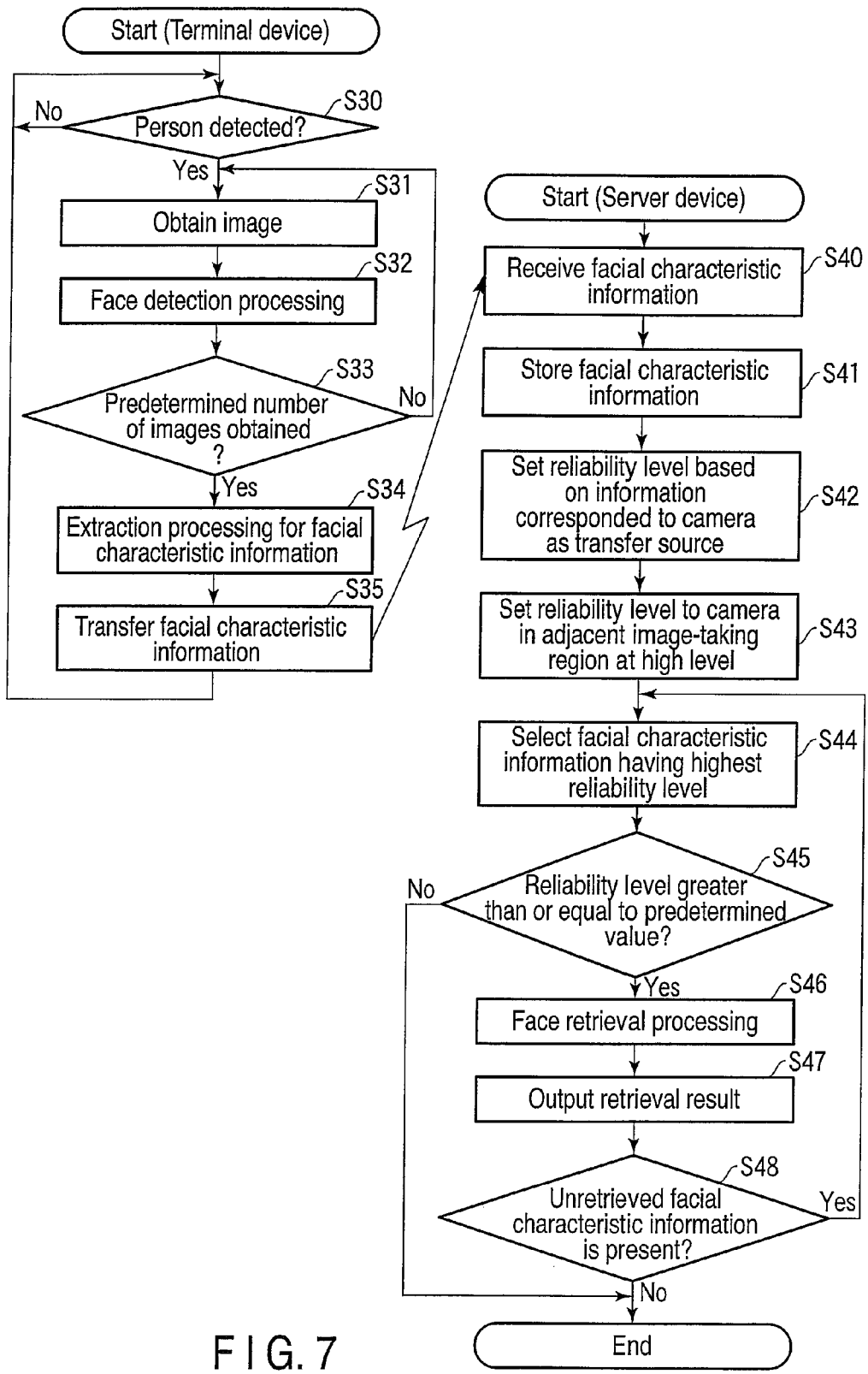
FIG. 7 is a flowchart for explaining a processing flow in the person retrieval apparatus according to the second embodiment.

FIG. 7 is a flowchart for explaining a flow of the processing in the person retrieval apparatus 2.

The steps S30 to S35 shown in FIG. 7 represent processings until each of the terminal devices 21 transfers the facial characteristic information to the server device 2. The processings from the steps S30 to S35 can be realized by processings equivalent to the steps S10 to S12, S14 to S15, and S17 shown in FIG. 4. However, in the step S17, each of the terminal devices 21 transfers the facial characteristic information (input subspace) extracted from the facial characteristic extraction section 213 and information indicating a camera (or the image-taking position of the camera) having taken the face image as the extraction source of the relevant facial characteristic information to the server device 22.

The server device 22 receives the facial characteristic information from each of the terminal devices 21 as needed (step S40). For example, when the facial characteristic information to which the information indicating a camera is added is sent from the terminal device 21A, the server device 22 receives the information from the communication control section 221. The communication control section 121 supplies the facial characteristic information, which has been received from each of the terminal devices 21 and contains the information indicating the camera, to the face retrieval section 226. Thereby, the face retrieval section 226 temporarily stores the information in the memory 226a (step S41), and, at the same time, the information indicating the camera added to the facial characteristic information is supplied to the reliability level setting section 224.

When the information indicating the camera is given from the face retrieval section 226 to the reliability level setting section 224, the reliability level setting section 224 sets the reliability level to the facial characteristic information or performs the processing such as updating of information corresponded to other cameras, on the basis of the information corresponded to the relevant camera (step S42 and S43).

As mentioned above, the method of setting the reliability level is determined in accordance with the operation configuration of the person retrieval apparatus 1. Here, the reliability level is set based on the attention information corresponded to each camera. Namely, the information indicating the camera, having taken the face image from which the relevant facial characteristic information was extracted, is given to the reliability level setting section 224, the reliability level setting section 224 reads the attention information corresponded to the relevant camera from the position information storage section 222. When the reliability level setting section 224 obtained the attention information, corresponded to the relevant camera, from the position information storage section 222, it determines the priority level in the face retrieval processing on the relevant facial characteristic information as the reliability level, on the basis of the obtained attention information. When the reliability level was determined, the reliability level setting section 224 sets the determined reliability level as the reliability level in the face retrieval processing on the facial characteristic information which is stored in the face retrieval section 226 and contains the information indicating the relevant camera (step S42). At that time, for example, as shown in FIG. 2, the facial characteristic information may be rearranged in descending order of the reliability level (in the priority of the face retrieval processing) to be stored in the face retrieval section 226.

When the reliability level in the face retrieval processing on the facial characteristic information, received from the terminal device 21, is set, the reliability level setting section 224 performs setting to increase the reliability level in the face retrieval processing on the face image (step S43), which has taken by each camera in the image taking region adjacent to the camera which has taken the face image as the extraction source of the facial characteristic information. For the purpose of increasing the reliability level in the face retrieval processing on the face image taken by each of the adjacent cameras, the reliability level setting section 224 performs the processing of updating the attention information corresponding to each of the adjacent cameras. Namely, the reliability level setting section 224 reads the position relation information, which is corresponded to the camera which has taken the face image as the extraction source of the facial characteristic information, from the position information storage section 222. When the reliability level setting section 224 obtained the position relation information, it distinguishes each camera in the image taking region adjacent to the image taking region of the relevant camera, on the basis of the obtained position relation information. Subsequently, the reliability level setting section 224 updates the attention information corresponding to each of the cameras into a value for realizing the reliability level is set to be high.

The processings from the steps S40 to S43 are performed as needed every when the facial characteristic information is received from each of the terminal devices 21. Namely, the processings from the steps S30 to S35 in each of the terminal devices 21 and the processings from the steps S40 to S43 in the server device 32 are performed as the series of processings every when the person's face is taken by each of the cameras 211.

Meanwhile, the server device 22 performs the processings from steps S44 to S48 shown in FIG. 7 in parallel with the processings from steps S40 to S43. The processings from steps S44 to S47 shown in FIG. 7 are similar to the processings from steps S23 to S27 shown in FIG. 4. Namely, in the processing up to the step S43, the server device 22 sequentially performs the face retrieval processing on the facial characteristic information, accumulated in the memory 226a in the face retrieval section 226, in descending order of the reliability level.

As described above, in the person retrieval apparatus 2 as the second embodiment, the attention information, which shows that the face retrieval processing on the facial characteristic information, extracted from the image taken by each camera, is preferentially performed, or the position relation information, which shows the position relation between the image taking region of the relevant camera and that of the other cameras, are corresponded to each camera and stored. With respect to the facial characteristic information extracted from the image taken by each camera, the reliability level is set based on the attention information or position relation information corresponded to each camera. Thereby, the person retrieval apparatus 2 performs the face retrieval processing in descending order of the reliability level, which is set based on the attention information and the position relation information. As the result, the person retrieval apparatus 2 can perform the efficient face retrieval processing in accordance with the operation configuration. Especially, when the face retrieval processing on each facial characteristic information, extracted from the images taken by a plurality of cameras, is performed in a concentrated manner in the server device or the like, the retrieval processing can be optimized and streamlined by the above processing procedure.

Next, a third embodiment is explained.

FIG. 8 schematically shows a constitution of a person retrieval apparatus 3 according to the third embodiment.

The person retrieval apparatus 3 is constituted of a plurality of terminal devices 31 (31A, 31B, . . . ) and one (or plurality of) server device 32.

Each of the terminal devices 31 (31A, 31B, . . . ) has a camera (for example, a video camera) 311, a face detecting section 312 and a characteristic extraction section 313. Such a constitution of each of the terminal devices 31 (31A, 31B, . . . ) is realized by a control unit to which a camera 311 is connected. In this case, the control unit is realized by a constitution similar to a computer for performing image input/output processing and image processing. The face detecting section 312 and the characteristic extraction section 313 can be constituted as a function realized in that a CPU performs a processing program stored in a memory.

The camera 311 is constituted in a similar manner to the camera 111 explained in the first embodiment. The face detecting section 312 has a face detection processing section 312a constituted in a similar manner to the face detection processing section 112a explained in the first embodiment. The face detection processing section 312a detects the face image from the image obtained by the face detection processing similar to that by the face detection processing section 112a. Namely, the face detecting section 312 sequentially obtains the images taken by the camera 311. In the face detecting section 312, the face image of a person who is a target to be retrieved is detected from the obtained images by the face detection processing section 312a. The face detecting section 312 supplies the face image, detected by the face detection processing section 312a, to the characteristic extraction section 313.

The characteristic extraction section 313 has a first extraction processing section 313a and a second extraction processing section 313b. The first extraction processing section 313a is constituted in a similar manner to the extraction processing section 113a explained in the first embodiment. The first extraction processing section 313a extracts the facial characteristic information (input subspace) from a face image group, detected by the face detecting section 312, by the extraction processing of the facial characteristic information, which is similar to the extraction processing performed by the extraction processing section 113a.

The second extraction processing section 313b extracts the personal characteristic information (second characteristic information), which is different from the facial characteristic information (first characteristic information) extracted by the first extraction processing section 313a. The second extraction processing section 313b extracts the personal characteristic information, which is the characteristic information except the facial characteristic information capable of specifying a person and is the information capable of being extracted from the image taken by the camera 311.

The personal characteristic information extracted by the second extraction processing section 313b is used for tracking a person. The information for tracking the person (tracking information) is used for determining the reliability level in the face retrieval processing on the facial characteristic information, which has been extracted by the first extraction processing section 313a. The reliability level is information for realizing the efficient face retrieval processing performed by the person retrieval apparatus 3. Therefore, in the personal characteristic information extracted by the second extraction processing section 313b, it is preferable to obtain at least the result of the tracking processing at higher speed than the face retrieval processing on the facial characteristic information extracted by the first extraction processing section 313a.

As an example of the personal characteristic information (second characteristic information) satisfying the above condition, a color histogram in the entire image of the relevant person is considered. The color histogram in the entire image of the relevant person is adapted for capturing the characteristics of the relevant person such as the appearance. In addition, the color histogram in the entire image of the relevant person is adapted for capturing the characteristics of the relevant person from the image in which the person's face does not face the front. Further, the similarity between the plurality of color histograms can be determined at higher speed than the face retrieval processing. However, in the person retrieval apparatus 3 using the color histogram as the personal characteristic information, the image taken by the camera 311 is the color image.

Figure 9:
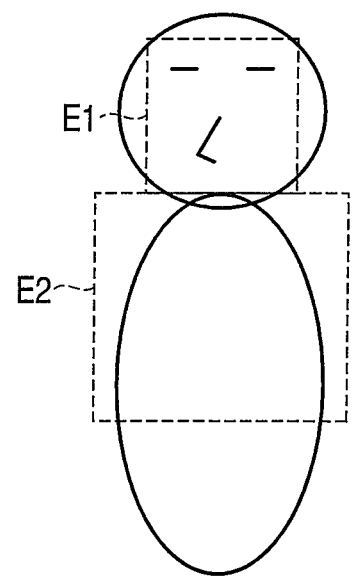
FIG. 9 is a view for explaining a method for detecting personal characteristic information (second characteristic information) in the third embodiment.
Figure 10:
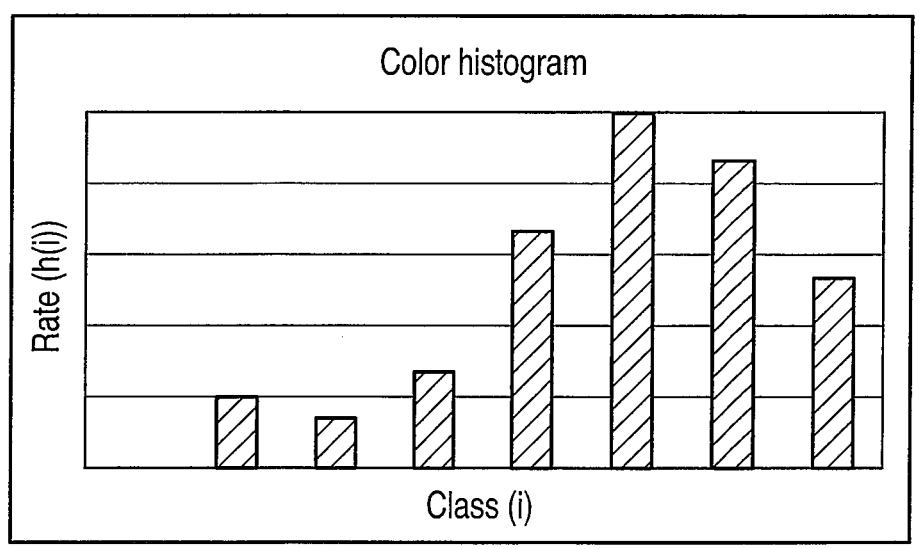
FIG. 10 is a view showing an example of the personal characteristic information (second characteristic information) in the third embodiment.

FIG. 9 is a view for explaining an example of processing of detecting the entire image of a person, on the basis of the detection result in the face image. FIG. 10 is a graph showing an example of the color histogram.

As shown in FIG. 9, information, which shows a region (face region) E1 of the face image detected by the face detecting section 312 and an image taken by the camera 311 are given to the second extraction processing section 313b. The second extraction processing section 313b estimates an image region (person region) E2 except the face of the relevant person, on the basis of the face region E1 in the image taken by the camera 311. Namely, the second extraction processing section 313b detects the person region E2 which is adjacent to the lower side of the face region E1 and is a body part positioned lower than the face part. When the person region E2 is detected, the second extraction processing section 313b generates the color histogram, which is obtained from a value of each pixel constituting the person region E2, as shown in FIG. 10. The second extraction processing section 313b extracts the information indicating the color histogram as the personal characteristic information (second characteristic information).

The characteristic extraction section 313 transfers the facial characteristic information extracted by the first extraction processing section 313a and the personal characteristic information extracted by the second extraction processing section 313b to the server device 32 in such a state that these information are corresponded to each other. Note that these information are transferred to the server device 32 such that the information (discrimination information of the terminal device or camera) showing the relevant terminal device 31 or the camera 311 is added to these information.

Next, the constitution of the server device 32 will be described.

As shown in FIG. 8, the server device 32 has a communication control section 321, a person tracking section 322, a reliability level setting section 324, a registration information storage section 325, a face retrieval section 326, a display section 327, a notification section 328, and so on.

The server device 32 is realized by a constitution similar to a computer capable of performing image input/output processing and image processing. Namely, the server device 32 can be realized by a computer having a CPU, various types of memories, a communication interface, a display device, and so on. For example, an information processing function realized by the communication control section 321, the person tracking section 322, the reliability level setting section 324, the face retrieval section 326, and the like can be constituted as a function realized in that the CPU performs a processing program stored in a memory.

The communication control section 321 is constituted of a communication interface for communication with each of the terminal devices 31, a control section for processing information received from each of the terminal devices 31, and so on. The communication control section 321 sequentially receives the facial characteristic information and the personal characteristic information supplied from each of the terminal devices 31. When the communication control section 321 has received the facial characteristic information and the personal characteristic information from each of the terminal devices 31, it supplies the received personal characteristic information to the person tracking section 322, and, at the same time, supplies the received facial characteristic information to the face retrieval section 326. The discrimination information containing the information indicating the terminal device or camera is given to the personal characteristic information and the facial characteristic information received from each of the terminal devices 31. Thus, the personal characteristic information and the facial characteristic information can correspond to each other by the discrimination information. For example, in the server device 32, the personal characteristic information and the facial characteristic information are corresponded to each other by the discrimination information.

The person tracking section 322 tracks a person on the basis on the personal characteristic information of the relevant person, which is supplied from each of the terminal devices 31 through the communication control section 321. The person tracking section 322 has a memory 322*a* for storing the personal characteristic information supplied from each of the terminal devices 31. Every when the personal characteristic information is given to the person tracking section 322, the person tracking section 322 sequentially stores the relevant personal characteristic information and information (for example, discrimination information, information indicating an image-taking position where the image, which is the extraction source of the relevant personal characteristic information, was taken, information indicating a date of taking the image as the extraction source of the relevant personal characteristic information), which is given with the relevant personal characteristic information, in the memory 322*a* in such a state that these information are corresponded to each other.

Further, the information, which is corresponded to each personal characteristic information and shows the result of the face retrieval processing performed by the face retrieval section 326, is stored in the memory 322*a*. When the face retrieval processing is not performed by the face retrieval section 326, the information indicating that, which is the result of the face retrieval processing, is stored in the memory 322*a* (or not stored). The tracking information as the result of the person tracking processing on be hereinafter described may be stored in the memory 322*a* so as to correspond to each personal characteristic information. Namely, history information containing the personal characteristic information is stored in the memory 322*a*.

When the personal characteristic information is newly given to the person tracking section 322, the person tracking section 322 stores the new personal characteristic information in the memory 322*a*, and, at the same time, performs the person tracking processing on a person corresponding to the given personal characteristic information. As the person tracking processing, the person tracking section 322 performs the processing on correspond the given personal characteristic information and each personal characteristic information, which has been stored in the memory 322*a*, to each other. This processing is determined based on the determination result of whether the given personal characteristic information and each personal characteristic information stored in the memory 322*a* are that of the same person. Namely, the person tracking section 322 performs the processing (identification processing) of determining whether the given personal characteristic information and each personal characteristic information stored in the memory 322*a* are that of the same person.

For example, when the color histogram is used as the above-mentioned personal characteristic information, the person tracking section 322 calculates the similarity between the given color histogram and each color histogram, stored in the memory 322*a*, as the identification processing. Note that the similarity between two color histograms is defined by the following formula (2):

$$S=\min(h_1(i),h_2(i))$$

When the similarity between the given color histogram and each color histogram stored in the memory 322*a* is calculated, the person tracking section 322 determines whether the calculated similarity is not less than a predetermined threshold value (which is used for determining whether the color histograms are that of the same person). Namely, when the similarity is not less than the predetermined threshold value, the person tracking section 322 determines that the two color histogram as the relevant similarity are seem to be that of the same person. When the similarity is less than the predetermined threshold value, the person tracking section 322 determines that the two color histogram as the relevant similarity are not seem to be that of the same person. The person tracking section 322 can obtain the above-described determination result as the result of the identification processing.

The person tracking section 322 detects each personal characteristic information, which is stored in the memory 322*a* and has been determined to be that of the person with the given personal characteristic information, based on the result of the identification processing. The person tracking section 322 arranges the information, which shows the image-taking position corresponded to each characteristic information determined (identified) to be that of the person with the given personal characteristic information, in time series order based on obtaining date information.

The result of the person tracking processing on the person having the given personal characteristic information, that is, the tracking information is the information in which the information, which shows the image-taking position corresponded to the respective facial characteristic information identified to be that of the person with the given personal characteristic information, are arranged in time series order. The person tracking section 322 supplies the tracking information as the result of the tracking processing on the reliability level setting section 324 so as to correspond the tracking information to the discrimination information given to the given personal characteristic information.

The reliability level setting section 324 sets the reliability level in the face retrieval processing on the facial characteristic information, received from each of the terminal devices 31, on the basis of the result of the tracking processing for the person, that is, the tracking information of the relevant person supplied from the person tracking section 322. There are various methods of setting the reliability level in the reliability level setting section 324 in accordance with the operation configuration.

For example, as the method of setting the reliability level, it is considered that high reliability level is set to the facial characteristic information of a person to whom both the face retrieval processing has failed and the tracking has succeeded, or it is considered that low reliability level is set to the facial characteristic information of person to whom the face retrieval processing and the tracking have succeeded. It is considered that the former method is applied to an operation configuration in which the person to whom the face retrieval (person retrieval) has failed is desired to be tracked and preferentially subjected to the face retrieval processing. Meanwhile, it is considered that the latter method is applied to an operation configuration in which the person with low need of the face retrieval processing is tracked while the face retrieval processing on other person is desired to be preferentially performed.

The face retrieval section 326 has a function of performing the face retrieval processing based on the similarity calculation by the mutual subspace method between the input characteristic information (input subspace) and each dictionary characteristic information (dictionary subspace) as with the face retrieval section 126 explained in the first embodiment. The face retrieval section 326 also has a function of performing the face retrieval processing in the order based on the reliability level given from the reliability level setting section 324, as with the face retrieval section 126.

However, in the face retrieval section 326, the facial characteristic information, to which the discrimination information supplied from each of the terminal devices 31 through the communication control section 321, is stored in the memory 326a. In this state, the reliability level corresponded to the discrimination information is supplied from the reliability level setting section 324 to the face retrieval section 326. The memory 326a of the face retrieval section 326 stores the reliability level, given from the reliability level setting section 324, as the reliability level of the facial characteristic information corresponded by the discrimination information. Thereby, each facial characteristic information and the reliability level corresponded to each other are stored in the memory 326a of the face retrieval section 326. Note that the face retrieval section 326 may rearrange the reliability level in the descending order when the reliability level is set, and then may store the reliability level in the memory 326a.

The registration information storage section 325 stores information of each registrant as the dictionary date for retrieval, as with the registration information storage section 125 explained in the first embodiment. Namely, at least facial characteristic information (dictionary facial characteristic information), extracted from the face image group for registration of each registrant, is stored in the registration information storage section 325, as with the registration information storage section 125.

The display section 327 is constituted in a similar manner to the display section 127 explained in the first embodiment. Namely, the display section 327 displays the face retrieval result obtained by the face retrieval section 326, as with the display section 127. The notification section 328 is constituted in a similar manner to the notification section 128 explained in the first embodiment. Namely, the notification section 328 performs notification in accordance with the face retrieval result obtained by the face retrieval section 326, as with the notification section 128.

Next, a processing example in the person retrieval apparatus 3 will be described.

Figure 11:
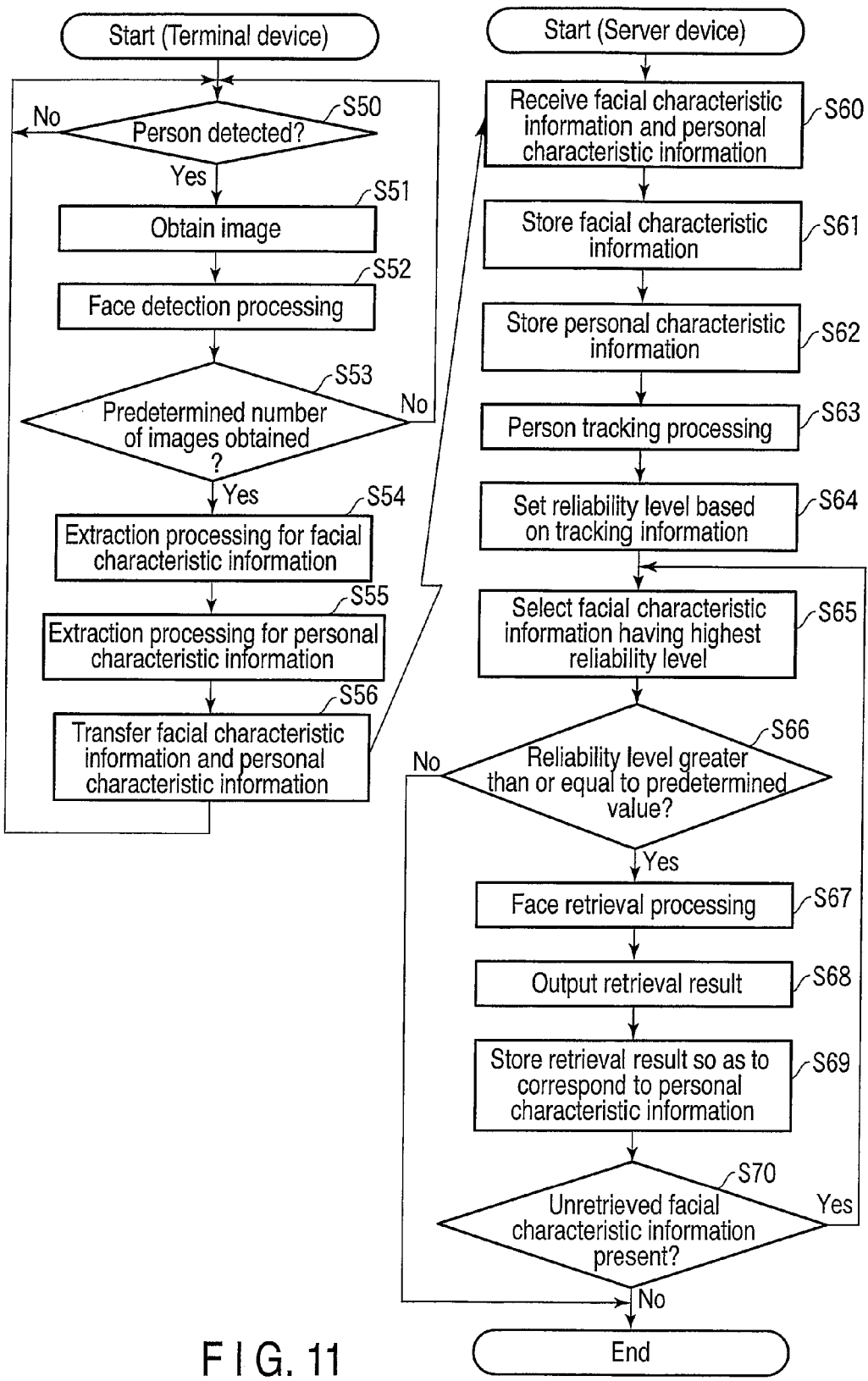
FIG. 11 is a flowchart for explaining a processing flow in the person retrieval apparatus according to the third embodiment.

FIG. 11 is a flowchart for explaining a flow of the processing in the person retrieval apparatus 3.

The processings from steps S50 to S56 shown in FIG. 11 show the processings until the facial characteristic information (first characteristic information) and the personal characteristic information (second characteristic information) are transferred from each of the terminal devices 31 to the server device 32. Each of the processings in the steps S50 to S54 can be realized by processings equivalent to the steps S10 to S12 and S14 to S15 shown in FIG. 4. However, in each of the terminal devices 31, the second extraction processing section 313b performs processing of extracting the personal characteristic information, on the basis of the image taken by the camera 311 (step S55).

In the extraction processing for the personal characteristic information performed by the second extraction processing section 313b, the personal characteristic information is extracted by the above-mentioned method. Namely, when the color histogram in the entire image of a person is used as the personal characteristic information, the second extraction processing section 313b detects a region of the entire image of the person, which is estimated based on the detection result of the face image, to extract the color histogram in the detected entire image of the person.

When the personal characteristic information is extracted, the characteristic extraction section 313 transfers the facial characteristic information extracted by the first extraction section 313a in the step S54, the personal characteristic information extracted by the second extraction processing section 313b in the step S55, and the additional information to the server device 32 (step S56). The additional information, which is given to the facial characteristic information and the personal characteristic information, contains information indicating a camera, having taken the image as the extraction source of the facial characteristic information, information indicating a position where the image, which is the extraction source of the facial characteristic information, was taken, information indicating the date and time of taking the image, which is the extraction source of the facial characteristic information, and other information.

The server device 32 receives the information from each of the terminal device 31, as needed (step S60). For example, when the facial characteristic information and the personal characteristic information to which the additional information is given are sent from the terminal device 31A, these information is received by the communication control section 321 in the server device 32. The communication control section 321 supplies the facial characteristic information received from each of the terminal devices 31 and the additional information to the face retrieval section 326. The face retrieval section 326 then temporarily stores these information in the memory 326a (step S61).

In addition, the communication control section 321 supplies the personal characteristic information received from each of the terminal device 31 and the additional information to the person tracking section 322. The person tracking section 322 then stores these information in the memory 322a (step S62). When the personal characteristic information has been stored in the memory 322a, the person tracking section 322 performs the tracking processing on the person having the received personal characteristic information (step S63). The tracking processing on a person can be realized by the above-mentioned method.

Namely, the person tracking section 322 calculates the similarity between the received personal characteristic information and the personal characteristic information previously stored in the memory 322a. When such a similarity has been calculated, the person tracking section 322 selects the personal characteristic information from among the calculated similarities. The personal characteristic information, which is selected by the person tracking section 322, has been previously stored in the memory 322a and has the similarity not less than a predetermined threshold value (threshold value for identification), that is, the previous personal characteristic information which seems to be that of the person having the received personal characteristic information. After the selection, the tracking section 322 generates the tracking information to the relevant person on the basis of the selected previous personal characteristic information, which are arranged in time series order in accordance with the information indicating the image taking date and time.

When the tracking information to the person having the relevant personal characteristic information is obtained by the person tracking processing, the person tracking section 322 supplies the obtained tracking information to the reliability level setting section 324. When the tracking information is given from the person tracking section 322 to the reliability level setting section 324, the reliability level setting section 324 performs the setting processing of the reliability level based on the tracking information (step S64). The method of setting the reliability level in the reliability level setting section 324 is determines in accordance with the operation configuration of the person retrieval apparatus 3, as mentioned above. In this embodiment, the reliability level is set based on the previous result of the face retrieval processing on a person specified by the tracking information and the tracking condition to the relevant person.

For example, there is a case in which the face retrieval processing is not performed when the result of the face retrieval processing, which shows that the target person is the registrant, has been obtained. In this case, the reliability setting section 324 determines whether the relevant person has been determined to seemed to be the registrant, on the basis of the previous result of the face retrieval processing on a person specified by the tracking information. When there is no record in which the relevant person has been determined as the registrant, the reliability level setting section 324 sets the reliability level in the face retrieval processing on the relevant person at relatively high value. When there is a record in which the relevant person has been determined as the registrant, the reliability level setting section 324 sets the reliability level at lower value than a predetermined value, so as to avoid performing the face retrieval processing on the facial characteristic information of the relevant person.

In addition, it is considered that the face retrieval processing is preferentially performed to predetermined registrants such as a prowler and an important person. In this case, the reliability level setting section 324 determines whether a person is highly likely to be the predetermined registrant, on the basis of the previous result of the face retrieval processing on the relevant person specified by the tracking information. When it is determined that the relevant person is highly likely to be the predetermined registrant, the reliability level setting section 324 sets the reliability level in the face retrieval processing on the relevant person at relatively high level. Meanwhile, when it is determined that the relevant person is less likely to be the predetermined registrant, the reliability level setting section 324 sets the reliability level in the face retrieval processing on the relevant person at relatively low level. Note that when the relevant person is highly unlikely to be the predetermined registrant, the reliability level setting section 324 may set the reliability level at lower value than a predetermined value so as to avoid performing the face retrieval processing on the facial characteristic information of the relevant person.

The reliability level set by the reliability level setting section 324 is stored so as to correspond to the facial characteristic information stored in the memory 326a of the face retrieval section 326 in the step S61. At that time, for example, the facial characteristic information may be rearranged in descending order of the reliability level (in priority order of the face retrieval processing) and stored in the face retrieval section 326, as shown in FIG. 2.

The processings from the steps S60 to S64 are performed as needed every when the face retrieval information is received from each of the terminal devices 31. Namely, the processings from the step S50 to S56 in each of the terminal devices 31 and the processings from the step S60 to S64 in the server device 32 are performed as the series of processings every when a person's face is taken by each of the cameras 311.

Additionally, in the server device 32, the processing from the steps S65 to S70 shown in FIG. 11 are performed in parallel with the processings from the steps S60 to S64. The processing from the steps S65 to S70 shown in FIG. 11 are equivalent to the processings from the steps S23 to S27 shown in FIG. 4. Namely, in the server device 32, the face retrieval processing on the facial characteristic information accumulated in the memory 326a in the face retrieval section 326 are sequentially performed in descending order of the reliability level by the processings up to the step S64.

As mentioned above, in the person retrieval apparatus 3 as the third embodiment, when the facial characteristic information is extracted from the image taken by each camera, the tracking processing on the person having the relevant facial characteristic information is performed. The person retrieval apparatus 3 sets the reliability level in the face retrieval processing on the facial characteristic information of the relevant person, on the basis of the tracking result of the relevant person obtained by the tracking processing. Thereby, the person retrieval apparatus 3 performs the face retrieval processing in descending order of the reliability level, which has been set in accordance with the tracking result of each person. As a result, the person retrieval apparatus 3 can perform the efficient face retrieval processing in accordance with the operation configuration. Especially, when the face retrieval processing on the respective facial characteristic information extracted from the images taken by the plurality of cameras are performed in a concentrated manner by the server device, the retrieval processing can be optimized or streamlined by the above processing procedure.

Note that the constitution examples of the person retrieval apparatuses 1, 2 and 3 in each embodiment respectively shown in FIGS. 1, 5 and 8 can be suitably changed. For example, the facial characteristic extraction section may be provided in the server device. In such a constitution, the terminal device is constituted of the camera and the face detecting section, whereby the facial characteristic extraction section is added to the server device. Namely, each terminal device transfers the detection result of the face image to the server device, and the facial characteristic information may be extracted based on the detection result of the face image that the server device has been received from each terminal device.

In addition, the face detecting section and the facial characteristic extraction section may be provided in the server device. In this constitution, a plurality of cameras placed at each point are connected to the server device. Namely, the processing of detecting the face from the image taken by each camera and the processing of extracting the facial characteristic information from the detected face image may be performed by the server device.

The above embodiments describe the person retrieval processing and person retrieval apparatus based on the face image or facial characteristic information as the biometric information. However, the above embodiments can be applied to the person retrieval processing based on other biometric information. Especially, the above embodiments can be applied to the person retrieval apparatus for retrieving a person on the basis of the biometric information extracted from an image taken by an image pickup device such as a camera.

According to one embodiment of this invention, a person retrieval apparatus capable of efficiently performing person retrieval processing based on biometric information can be provided.

What is claimed is:

1. A person retrieval apparatus for retrieving a person on the basis of personal face image information, comprising:
    an extraction section which extracts personal face image information from images taken by one or more cameras;
    a position storage section which stores information indicating a priority level of person retrieval processing according to an image-taking position of each camera;
    a setting section which sets a reliability level to the face image information extracted by the extraction section on the basis of information, stored in the position storage section, indicating the priority level of the person retrieval processing according to the image-taking position of each camera;
    a memory which stores the face image information extracted by the extraction section and the reliability level set by the setting section in association with each other; and
    a retrieval section which performs the person retrieval processing on each piece of face image information stored in the memory, in descending order of the reliability level corresponding to each piece of face image information.

2. The person retrieval apparatus according to claim 1, wherein the setting section sets the reliability level in each piece of face image information, which has the highest priority level of the person retrieval processing on the image-taking position of a camera having taken an image, which is an extraction source of each piece of face image information, so that the person retrieval processing is most-preferentially performed.

3. The person retrieval apparatus according to claim 1, wherein the position storage section further stores position relation information indicating a position relation to the image-taking position of each camera, and
    the setting section further sets the reliability level corresponding to the face image information extracted from images taken by each camera so that the reliability level is relatively changed, on the basis of the position relation, which is indicated by the position relation information, between a camera which has taken an image as the extraction source of each piece of face image information and other cameras.

4. The person retrieval apparatus according to claim 3, wherein the setting section sets at a high level the reliability level corresponding to the face image information which is extracted from the images taken by each camera in the image-taking position adjacent to the image-taking position of the camera having taken the image, which is the extraction source of the face image information in which the reliability level is set.

5. The person retrieval apparatus according to claim 3, wherein, when the person retrieval processing on the face image information is failed in the retrieval section, the setting section sets at a high level the reliability level corresponding to the face image information which is extracted from images taken by each camera in the image-taking position adjacent to the image-taking position of the camera having taken the image, which is the extraction source of the face image information.

6. The person retrieval apparatus according to claim 1, wherein the retrieval section does not perform the person retrieval processing on the face image information whose reliability level set by the setting section is less than a predetermined value.

* * * * *

UNITED STATES PATENT AND TRADEMARK OFFICE
CERTIFICATE OF CORRECTION

PATENT NO. : 8,965,061 B2
APPLICATION NO. : 12/540886
DATED : February 24, 2015
INVENTOR(S) : Mitsutake Hasebe et al.

Page 1 of 1

It is certified that error appears in the above-identified patent and that said Letters Patent is hereby corrected as shown below:

On the title page, Item (73), the Assignee's Information is incorrect. Item (73) should read:

--(73) Assignee: Kabushiki Kaisha Toshiba, Tokyo (JP)--

Signed and Sealed this
Seventh Day of July, 2015

Michelle K. Lee
*Director of the United States Patent and Trademark Office*